(12) United States Patent
Valint, Jr. et al.

(10) Patent No.: US 6,630,243 B2
(45) Date of Patent: **\*Oct. 7, 2003**

(54) SURFACE TREATMENT OF SILICONE HYDROGEL CONTACT LENSES COMPRISING HYDROPHILIC POLYMER CHAINS ATTACHED TO AN INTERMEDIATE CARBON COATING

(75) Inventors: Paul L. Valint, Jr., Pittsford, NY (US); Daniel M. Ammon, Jr., Rochester, NY (US); Joseph A. McGee, DeWitt, NY (US); George L. Grobe, III, Pittsford, NY (US); Richard M. Ozark, Solvay, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/315,306

(22) Filed: May 20, 1999

(65) Prior Publication Data

US 2002/0102415 A1 Aug. 1, 2002

(51) Int. Cl.[7] .............................. B32B 7/04; B05D 3/00; B05D 3/10
(52) U.S. Cl. .................. 428/420; 428/411.1; 427/2.24; 427/533; 427/536; 427/539; 623/6.62
(58) Field of Search .................. 428/447, 446, 428/421, 411.1, 420; 427/2.24, 533, 536, 539; 544/72; 351/160 H, 177; 424/422; 623/6.62

(56) References Cited

U.S. PATENT DOCUMENTS 3,600,122 A * 8/1971 Coleman .................. 8/115.7
3,932,557 A * 1/1976 Matthews .................. 526/273
4,055,378 A 10/1977 Feneberg et al. ........... 351/160

(List continued on next page.)

FOREIGN PATENT DOCUMENTS

| EP | 0 157 212 A2 | 3/1985 | ........... C23C/16/26 |
| FR | 2649399 A | * 1/1991 | |
| WO | WO 94 06485 | 3/1994 | ........... A61L/27/00 |
| WO | WO 94/29756 | 12/1994 | ........... G02B/1/04 |
| WO | WO 95/04609 | 2/1995 | ........... B05D/7/24 |

OTHER PUBLICATIONS

Patent Abstracts of Japan Applicant: Koujiyundo Kaagaku Kenkyusho:KK Inventor: Futaki Takehiko, Title: Formation of Plasma Polymerized Film Publication No: 01230777 Publication Date: Sep. 14, 1989 Application Date: Mar. 9, 1988 Application No. 63055597.

*Primary Examiner*—Shrive P. Beck
*Assistant Examiner*—Elena Tsoy
(74) *Attorney, Agent, or Firm*—John E. Thomas

(57) ABSTRACT

The present invention provides an optically clear, hydrophilic coating upon the surface of a silicone medical device by sequentially subjecting the surface of the lens to plasma polymerization in a hydrocarbon-containing atmosphere and then covalently attaching a preformed hydrophilic polymer to the surface of the carbon coating. The invention is especially useful for forming a biocompatible coating on a silicone contact lens.

32 Claims, 2 Drawing Sheets

(2 of 2 Drawing Sheet(s) Filed in Color)

U.S. PATENT DOCUMENTS

| | | | |
|---|---|---|---|
| 4,122,942 A | 10/1978 | Wolfson | 206/5.1 |
| 4,143,949 A | 3/1979 | Chen | 351/160 |
| 4,214,014 A | 7/1980 | Hoffer et al. | 427/40 |
| 4,312,575 A * | 1/1982 | Peyman et al. | 351/160 H |
| 4,632,844 A | 12/1986 | Yanagihara et al. | 427/38 |
| 5,079,093 A * | 1/1992 | Akashi et al. | 428/411.1 |
| 5,080,924 A * | 1/1992 | Kamel et al. | 427/2 |
| 5,149,806 A * | 9/1992 | Moren et al. | 544/72 |
| 5,182,317 A * | 1/1993 | Winters et al. | 523/112 |
| 5,292,514 A * | 3/1994 | Capecchi et al. | 424/422 |
| 5,344,701 A | 9/1994 | Gagnon et al. | 428/304.4 |
| 5,352,714 A | 10/1994 | Lai et al. | 523/107 |
| 5,364,918 A | 11/1994 | Valint et al. | 526/245 |
| 5,443,455 A * | 8/1995 | Hergenrother et al. | 428/380 |
| 5,652,014 A | 7/1997 | Galin et al. | 427/2.24 |
| 5,662,960 A * | 9/1997 | Hostettler et al. | 427/2.3 |
| 5,710,302 A * | 1/1998 | Kunzler et al. | 556/434 |
| 5,804,318 A * | 9/1998 | Pinchuk et al. | 428/421 |
| 6,200,626 B1 * | 3/2001 | Grobe, III et al. | 427/2.24 |
| 6,213,604 B1 * | 4/2001 | Valint, Jr. et al. | 351/177 |
| 6,263,249 B1 * | 7/2001 | Stewart et al. | 607/116 |

\* cited by examiner

SURFACE TREATMENT OF SILICONE HYDROGEL CONTACT LENSES COMPRISING HYDROPHILIC POLYMER CHAINS ATTACHED TO AN INTERMEDIATE CARBON COATING

FIELD OF THE INVENTION

The present invention is directed toward the surface treatment of medical devices such as contact lenses and medical implants. In particular, the present invention is directed to a method of modifying the surface of a medical device to increase its biocompatibility or hydrophilicity by coating the device with a carbonaceous layer followed by the attachment of hydrophilic polymer chains to the carbon layer by means of chemical reaction between reactive functionalities on the carbonaceous layer and complementary reactive functionalities on the hydrophilic polymer. The present invention is also directed to a contact lens or other medical device having such a surface coating. The invention also encompasses certain copolymers useful for coating applications.

BACKGROUND

Contact lenses made from silicone materials have been investigated for a number of years. Such materials can generally be subdivided into two major classes: hydrogels and non-hydrogels. Non-hydrogels do not absorb appreciable amounts of water, whereas hydrogels can absorb and retain water in an equilibrium state. Hydrogels generally have a water content greater than about five weight percent and more commonly between about ten to about eighty weight percent. Regardless of their water content, both non-hydrogel and hydrogel silicone contact lenses tend to have relatively hydrophobic, non-wettable surfaces.

Those skilled in the art have long recognized the need for rendering the surface of contact lenses hydrophilic or more hydrophilic. Increasing the hydrophilicity of the contact-lens surface improves the wettability of the contact lenses with tear fluid in the eye. This in turn improves the wear comfort of the contact lenses. In the case of continuous-wear lenses, the surface is especially important. The surface of a continuous-wear lens must be designed, not only for comfort, but to avoid adverse reactions such as corneal edema, inflammation, or lymphocyte infiltration.

Silicone lenses have been subjected to plasma surface-treatment to improve their surface properties, for example, in order to make the surface more hydrophilic, deposit-resistant, scratch-resistant, and the like. Examples of common plasma surface treatments include subjecting contact lens surfaces to a plasma comprising: (1) an inert gas or oxygen as, for example, in U.S. Pat. Nos. 4,055,378; 4,122,942; and 4,214,014; (2) various hydrocarbon monomers as, for example, U.S. Pat. No. 4,143,949; and (3) combinations of oxidizing agents and hydrocarbons, for example, water and ethanol as in WO 95/04609 and U.S. Pat. No. 4,632,844. Sequential plasma surface treatments are also known, such as those comprising a first treatment with a plasma of an inert gas or oxygen, followed by a hydrocarbon plasma. For example, U.S. Pat. No. 4,312,575 to Peyman et al. discloses a process for providing a barrier coating on a silicone or polyurethane lens wherein the lens is subjected to an electrical glow discharge (plasma) involving a hydrocarbon atmosphere followed by oxygen in order to increase the hydrophilicity of the lens surface.

With an oxidizing plasma, for example $O_2$ (oxygen gas), water, hydrogen peroxide, air, or the like, the plasma tends to etch the surface of the lens, creating radicals and oxidized functional groups. When used as the sole surface treatment, such oxidation renders the surface of a silicone lens more hydrophilic. However, the coverage of such surface treatment may not be complete and the bulk properties of the silicone materials may remain apparent at the surface of the lens, (e.g., silicone molecular chains adjacent the lens surface are capable of rotating thus exposing hydrophobic groups to the outer surface). Such coatings have been found to be thin, whereas thicker coatings tend to crack. Hydrocarbon plasmas, on the other hand, deposit a thin carbon layer (e.g. from a few Angstroms to several thousand Angstroms thick) upon the surface of the lens, thereby creating a barrier between the underlying silicone materials and the outer lens surface. Following deposition of a thin carbon layer on the lens to create a barrier, plasma oxidation can be employed to increase the hydrophilicity of the surface.

Although known surface treatments can be effective in improving the surface properties of non-hydrogel silicone contact lenses, problems are encountered when such treatments are applied to hydrogel lens. Silicone hydrogel lenses are coated in an unhydrated state, but subsequently hydrated during manufacture and prior to use. This hydration causes the lens to dramatically swell, commonly from about ten to about twenty percent in volume, depending upon the water content of the lens. Such swelling of the lens commonly may cause plasma coatings to crack, delaminate, and/or rub off. Furthermore, plasma coatings can compromise lens hydration by not permitting proper lens expansion and thereby causing lens destruction.

Various patents disclose the attachment of hydrophilic or otherwise biocompatible polymeric chains to the surface of a contact lens in order to render the lens more biocompatible. For example, U.S. Pat. No. 5,652,014 teaches amination of a substrate followed by reaction with other polymers, such as a PEO star molecule or a sulfated polysaccharide. One problem with such an approach is that the polymer chain density is limited due to the difficult of attaching the polymer to the silicone substrate.

U.S. Pat. No. 5,344,701 discloses the attachment of oxazolinone or azlactone monomers to a substrate by means of plasma. The invention has utility in the field of surface-mediated or catalyzed reactions for synthesis or site-specific separations, including affinity separation of biomolecules, diagnostic supports and enzyme membrane reactors. The oxazolinone group is attached to a porous substrate apparently by reaction of the ethylenic unsaturation in the oxazolinone monomer with radicals formed by plasma on the substrate surface. Alternatively, the substrate can be coated with monomers and reacted with plasma to form a cross-linked coating. The oxazolinone groups that have been attached to the surface can then be used to attach a biologically active material, for example proteins, since the oxazolinone is attacked by amines, thiols, and alcohols. U.S. Pat. No. 5,364,918 to Valint et al. and U.S. Pat. No. 5,352,714 to Lai et al. disclose the use of oxazolinone monomers as internal wetting agents for contact lenses, which agents may migrate to the surface of the contact lenses.

In view of the above, it would be desirable to find an optically clear, hydrophilic coating for the surface of a silicone hydrogel contact lens or other medical device that provides good surface coverage that is durable and won't rub off or delaminate. Still further, it would be desirable to form a coating that allows the contact lens or other medical device to be more comfortable and biocompatible for longer periods of time, which coating, in the case of a contact lens, is simultaneously tear-wettable and highly permeable to oxygen. It would be desirable if such a biocompatibilized lens was capable of continuous wear overnight, preferable for a week or more without adverse effects to the cornea.

SUMMARY OF THE INVENTION

The present invention is directed toward the surface treatment of silicone contact lenses and other silicone medical devices, including a method of modifying the surface of a contact lens to increase its hydrophilicity or wettability. The surface treatment comprises coating the device with a carbon layer, followed by the attachment of hydrophilic polymer chains to the surface of the carbon layer. The carbon layer is then plasma treated to form reactive functionalities containing oxygen, nitrogen, and/or sulfur. Complementary reactive functionalities in monomeric units along a hydrophilic reactive polymer are then reacted with the reactive functionalities on the carbon layer. In a preferred embodiment, a contact-lens surface is pretreated with an oxidizing plasma prior to deposition of the carbon layer, in order to improve adhesion of the carbon layer. The present invention is also directed to a medical device comprising a surface made by such a method. Finally, the invention covers certain novel copolymers which are useful in coating applications.

BRIEF DESCRIPTION OF THE DRAWINGS

The file of this patent contains at least one drawing executed in color.

DETAILED DESCRIPTION OF THE INVENTION

Figure 1:
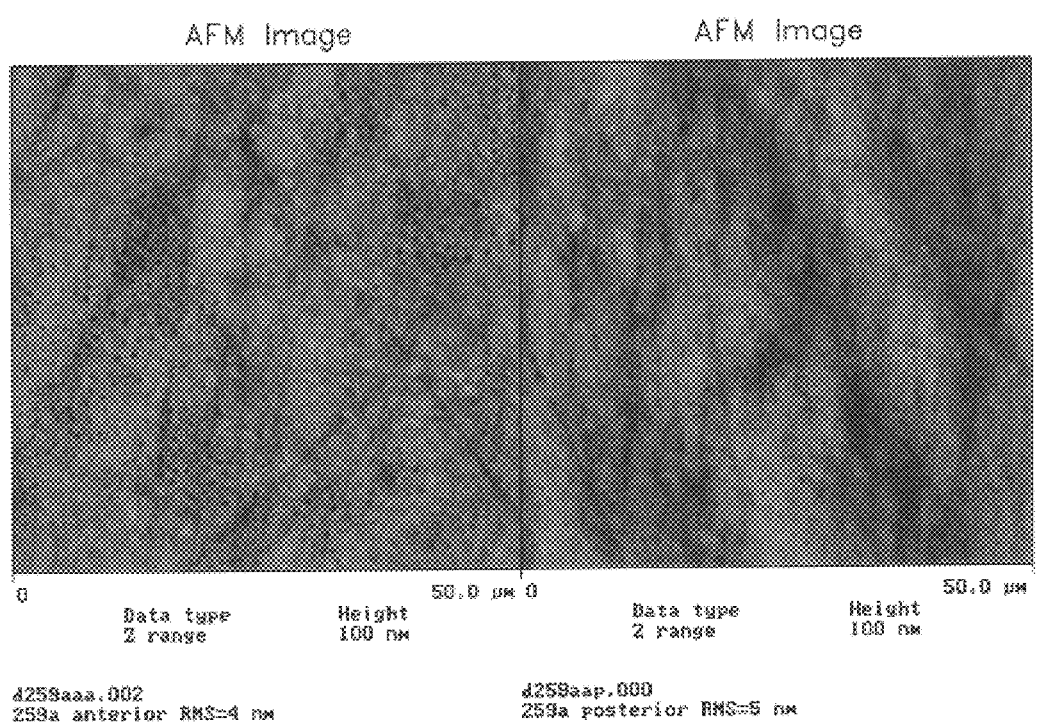
FIG. 1 shows an Atomic Force Microscopy (AFM) topographical images (50 $\mu m^2$) of a control contact lens described in Example 8 below, for comparison to a contact lens according to the invention, the image of the anterior side of the lens is shown on the left of FIG. 1 and the image of the posterior side is shown on the right.

As stated above, the present invention is directed toward surface treatment of silicone medical devices, including contact lenses, intraocular lenses and vascular implants, to improve their biocompatibility. By the term silicone, it is meant that the material being treated is an organic polymer comprising at least five percent by weight silicone (—OSi— linkages), preferably 10 to 100 percent by weight silicone, more preferably 30 to 90 percent by weight silicone. The present invention has been found very advantageous for application to contact lenses, either silicone hydrogels or silicone rigid-gas-permeable materials. The invention is especially advantageous for silicone hydrogel continuous-wear lenses. Hydrogels are a well-known class of materials, which comprise hydrated, cross-linked polymeric systems containing water in an equilibrium state. Silicone hydrogels generally have a water content greater than about five weight percent and more commonly between about ten to about eighty weight percent. Such materials are usually prepared by polymerizing a mixture containing at least one silicone-containing monomer and at least one hydrophilic monomer. Either the silicone-containing monomer or the hydrophilic monomer may function as a cross-linking agent (a cross-linker being defined as a monomer having multiple polymerizable functionalities) or a separate cross-linker may be employed. Applicable silicone-containing monomeric units for use in the formation of silicone hydrogels are well known in the art and numerous examples are provided in U.S. Pat. Nos. 4,136,250; 4,153,641; 4,740,533; 5,034,461; 5,070,215; 5,260,000; 5,310,779; and 5,358,995.

Examples of applicable silicon-containing monomeric units include bulky polysiloxanylalkyl (meth)acrylic monomers. An example of bulky polysiloxanylalkyl (meth)acrylic monomers is represented by the following Formula I:

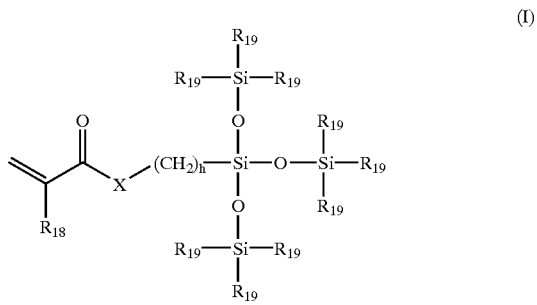

wherein:

X denotes —O— or —NR—;

each $R_{18}$ independently denotes hydrogen or methyl;

each $R_{19}$ independently denotes a lower alkyl radical, phenyl radical or a group represented by

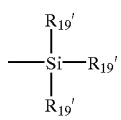

wherein each $R_{19}'$ independently denotes a lower alkyl or phenyl radical; and h is 1 to 10.

Some preferred bulky monomers are methacryloxypropyl tris(trimethylsiloxy)silane or tris(trimethylsiloxy) silylpropyl methacrylate, sometimes referred to as TRIS and tris(trimethylsiloxy)silylpropyl vinyl carbamate, sometimes referred to as TRIS-VCV.

Such bulky monomers may be copolymerized with a silicone macromonomer, which is a poly(organosiloxane) capped with an unsaturated group at two or more ends of the molecule. U.S. Pat. No. 4,153,641 to Deichert et al. discloses, for example, various unsaturated groups, including acryloxy or methacryloxy.

Another class of representative silicone-containing monomers includes silicone-containing vinyl carbonate or vinyl carbamate monomers such as: 1,3-bis[4-vinyloxycarbonyloxy)but-1-yl]tetramethyl-disiloxane; 3-(trimethylsilyl)propyl vinyl carbonate; 3-(vinyloxycarbonylthio)propyl-[tris(trimethylsiloxy) silane]; 3-[tris(tri-methylsiloxy)silyl] propyl vinyl carbamate; 3-[tris(trimethylsiloxy)silyl] propyl allyl carbamate; 3-[tris(trimethylsiloxy)silyl]propyl vinyl carbonate; t-butyldimethylsiloxyethyl vinyl carbonate; trimethylsilylethyl vinyl carbonate; and trimethylsilylmethyl vinyl carbonate.

Another class of silicon-containing monomers includes polyurethane-polysiloxane macromonomers (also sometimes referred to as prepolymers), which may have hard-soft-hard blocks like traditional urethane elastomers.

Examples of silicone urethanes are disclosed in a variety or publications, including Lai, Yu-Chin, "The Role of Bulky Polysiloxanylalkyl Methacryates in Polyurethane-Polysiloxane Hydrogels," *Journal of Applied Polymer Science*, Vol. 60, 1193–1199 (1996). PCT Published Application No. WO 96/31792 discloses examples of such monomers, which disclosure is hereby incorporated by reference in its entirety. Further examples of silicone urethane monomers are represented by Formulae II and III:

$$E(*D*A*D*G)_a*D*A*D*E'; \quad (II)$$

or $$E(*D*G*D*A)_a*D*G*D*E'; \quad (III)$$

wherein:

D denotes an alkyl diradical, an alkyl cycloalkyl diradical, a cycloalkyl diradical, an aryl diradical or an alkylaryl diradical having 6 to 30 carbon atoms;

G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

* denotes a urethane or ureido linkage;

a is at least 1;

A denotes a divalent polymeric radical of Formula IV:

$$-(CH_2)_{m'}-\left[\begin{array}{c}R_s\\|\\Si-O\\|\\R_s\end{array}\right]_p\begin{array}{c}R_s\\|\\Si\\|\\R_s\end{array}-(CH_2)_{m'}- \quad (IV)$$

wherein:

each Rs independently denotes an alkyl or fluoro-substituted alkyl group having 1 to 10 carbon atoms which may contain ether linkages between carbon atoms;

m' is at least 1; and p is a number that provides a moiety weight of 400 to 10,000;

each of E and E' independently denotes a polymerizable unsaturated organic radical represented by Formula VI:

$$\begin{array}{c}R_{23}\\|\\R_{24}-C=C-(CH_2)_{\overline{w}}-(X)_{\overline{x}}-(Z)_{\overline{z}}-(Ar)_{\overline{y}}-R_{25}-\\|\\R_{24}\end{array} \quad (VI)$$

wherein:

$R^{23}$ is hydrogen or methyl;

$R_{24}$ is hydrogen, an alkyl radical having 1 to 6 carbon atoms, or a —CO—Y—$R_{26}$ radical wherein Y is —O—, —S— or —NH—;

$R_{25}$ is a divalent alkylene radical having 1 to 10 carbon atoms;

$R_{26}$ is a alkyl radical having 1 to 12 carbon atoms;

X denotes —CO— or —OCO—;

Z denotes —O— or —NH—;

Ar denotes an aromatic radical having 6 to 30 carbon atoms;

w is 0 to 6; x is 0 or 1; y is 0 or 1; and z is 0 or 1.

A preferred silicone-containing urethane monomer is represented by Formula (VII):

$$E''-\left[\begin{array}{c}O\\\|\\OCN\\|\\H\end{array}-R_{27}-\begin{array}{c}O\\\|\\NCOCH_2CH_2OCH_2CH_2OCN\\|\\H\end{array}-R_{27}-\begin{array}{c}O\\\|\\NCO(CH_2)_m\\|\\H\end{array}\left(\begin{array}{c}CH_3\\|\\Si-O\\|\\CH_3\end{array}\right)_p\begin{array}{c}CH_3\\|\\Si-(CH_2)_m\\|\\CH_3\end{array}\right]_a \quad (VII)$$

$$E''-\begin{array}{c}H\\|\\OCN\\\|\\O\end{array}-R_{27}-\begin{array}{c}H\\|\\NCOCH_2CH_2OCH_2CH_2OCN\\\|\\O\end{array}-R_{27}-\begin{array}{c}H\\|\\NCO\\\|\\O\end{array}-$$

wherein m is at least 1 and is preferably 3 or 4, a is at least 1 and preferably is 1, p is a number which provides a moiety weight of 400 to 10,000 and is preferably at least 30, $R_{27}$ is a diradical of a diisocyanate after removal of the isocyanate group, such as the diradical of isophorone diisocyanate, and each E" is a group represented by:

$$\begin{array}{c}CH_3\\|\\CH_2=C-C(=O)-O-CH_2-CH_2-\end{array}$$

Another class of representative silicone-containing monomers includes fluorinated monomers. Such monomers have been used in the formation of fluorosilicone hydrogels to reduce the accumulation of deposits on contact lenses made therefrom, as described in U.S. Pat. Nos. 4,954,587, 5,079,319 and 5,010,141. The use of silicone-containing monomers having certain fluorinated side groups, i.e. —($CF_2$)—H, have been found to improve compatibility between the hydrophilic and silicone-containing monomeric units, as described in U.S. Pat. Nos. 5,387,662 and 5,321,108.

In one preferred embodiment of the invention, a silicone hydrogel material comprises (in bulk, that is, in the monomer mixture that is copolymerized) 5 to 50 percent, preferably 10 to 25, by weight of one or more silicone macromonomers, 5 to 75 percent, preferably 30 to 60 percent, by weight of one or more polysiloxanylalkyl (meth) acrylic monomers, and 10 to 50 percent, preferably 20 to 40 percent, by weight of a hydrophilic monomer. Examples of hydrophilic monomers include, but are not limited to, ethylenically unsaturated lactam-containing monomers such as N-vinyl pyrrolidinone, methacrylic and acrylic acids; acrylic substituted alcohols, such as 2-hydroxyethylmethacrylate and 2-hydroxyethylacrylate and acrylamides, such as methacrylamide and N,N-dimethylacrylamide, vinyl carbonate or vinyl carbamate monomers such as disclosed in U.S. Pat. No. 5,070,215, and oxazolinone monomers such as disclosed in U.S. Pat. No. 4,910,277. Other hydrophilic monomers will be apparent to one skilled in the art.

The above silicone materials are merely exemplary, and other materials for use as substrates that can benefit by being coated according to the present invention have been disclosed in various publications and are being continuously developed for use in contact lenses and other medical devices.

The subject method utilizes standard plasma oxidation and deposition processes (also referred to as "electrical glow discharge processes") to provide a thin, durable surface upon the medical device preliminary to the covalently bonded attachment of preformed hydrophilic polymers. Examples of such plasma processes are provided in U.S. Pat. Nos. 4,143,949; 4,312,575; and 5,464,667.

Although plasma processes are generally well known in the art, a brief overview is provided below. Plasma surface treatments involve passing an electrical discharge through a gas at low pressure. The electrical discharge may be at radio frequency (typically 13.56 MHz), although microwave and other frequencies can be used. Electrical discharges produce ultraviolet (UV) radiation, in addition to being absorbed by atoms and molecules in their gas state, resulting in energetic electrons and ions, atoms (ground and excited states), molecules, and radicals. Thus, a plasma is a complex mixture of atoms and molecules in both ground and excited states, which reach a steady state after the discharge is begun. The circulating electrical field causes these excited atoms and molecules to collide with one another as well as the walls of the chamber and the surface of the material being treated.

The deposition of a coating from a plasma onto the surface of a material has been shown to be possible from high-energy plasmas without the assistance of sputtering (sputter-assisted deposition). Monomers can be deposited from the gas phase and polymerized in a low pressure atmosphere (0.005 to 5 torr, preferably 0.001 to 1.0 torr) onto a substrate utilizing continuous or pulsed plasmas, suitably as high as about 1000 watts. A modulated plasma, for example, may be applied 100 milliseconds on then off. In addition, liquid nitrogen cooling has been utilized to condense vapors out of the gas phase onto a substrate and subsequently use the plasma to chemically react these materials with the substrate. However, plasmas do not require the use of external cooling or heating to cause the deposition. Low or high wattage (5 to 1000, preferably 20–500 watts) plasmas can coat even the most chemical-resistant substrates, including silicones.

The subject method will now be described in terms of a contact lens although also applicable to silicone medical devices in general. The method comprises:

(a) subjecting the surface of a lens substrate to a plasma polymerization deposition with a C1 to C10 saturated or unsaturated hydrocarbon to form a polymeric carbonaceous layer (or "carbon layer") on the lens surface;

(b) forming reactive functionalities on the surface of the carbon layer; and (c) attaching hydrophilic polymer chains to the carbon layer by reacting the reactive functionalities on the carbon layer with complementary isocyanate or ring-opening reactive functionalities along a reactive hydrophilic polymer.

Preferably, step (a) is preceded by subjecting the surface of the medical device to a plasma-oxidation reaction so as to more effectively bond the polymerized hydrocarbon coating to the lens in order to resist delamination and/or cracking of the surface coating from the lens upon lens hydration. Pretreatment is especially preferred in the case of a silicone hydrogel substrate. It has been found, that by subjecting a silicone hydrogel lens material to plasma oxidation prior to subsequent plasma polymerization (i.e., deposition of a carbon layer), the surface of the lens is prepared to better bind the carbon layer that is subsequently deposited on the lens. Thus, for example, if the lens is ultimately made from a hydrogel material that is hydrated (wherein the lens typically expands by ten to about twenty percent), the coating remains intact and bound to the lens, providing a more durable coating which is resistant to delamination or cracking, or excessive amounts thereof In step (a) then, a thin hydrocarbon coating is deposited on the lens, which is necessary to provide for more complete coverage of the underlying silicone material. In step (b), reactive functionalities are formed on the surface of the carbon layer to form the point of attachment for hydrophilic polymer chains. In step (c), the functionalized carbon surface is exposed to, and reacted with, hydrophilic reactive polymers, resulting in hydrophilic polymer chains attached to the carbon surface, rendering the carbon coating of step (a) hydrophilic. Any complementary reactive functionalities on the hydrophilic reactive polymer that remain unreacted, after attachment to the carbon surface at one or more locations, may be hydrolyzed as explained below. Preferably, on average the hydrophilic polymers become attached to the substrate surface at a plurality of points, therefore forming one or more loops on the surface.

As mentioned above, it is preferred to initially oxidize the surface of the lens; for example, a silicone hydrogel continuous-wear lens is initially oxidized by the use of an oxidation plasma to render the subsequent hydrocarbon deposition more adherent to the lens. Such an oxidation of the lens may be accomplished in an atmosphere composed of an oxidizing media such as oxygen or nitrogen containing compounds: ammonia, an aminoalkane, air, water, peroxide, $O_2$ (oxygen gas), methanol, acetone, alkylamines, etc., or appropriate combinations thereof, typically at an electric discharge frequency of 13.56 Mhz, preferably between about 20 to 500 watts at a pressure of about 0.1 to 1.0 torr, preferably for about 10 seconds to about 10 minutes or more, more preferably about 1 to 10 minutes. It is preferred that a relatively "strong" oxidizing plasma is utilized in this initial oxidation, for example, ambient air drawn through a five percent (5%) hydrogen peroxide solution. Those skilled in the art will know other methods of improving or promoting adhesion for bonding of the subsequent carbon layer. For example, plasma with an inert gas will also improve bonding. It would also be possible to deposit a silicon-containing monomer to promote adhesion.

In step (a), after the preferred but optional oxidative surface treatment, the lens surface is subjected to plasma polymerization reaction in a hydrocarbon atmosphere to form a polymeric surface on the lens. Any hydrocarbon capable of polymerizing in a plasma environment may be utilized; however, the hydrocarbon must be in a gaseous state during polymerization and have a boiling point below about 200° C. at one atmosphere. Preferred hydrocarbons include aliphatic compounds having from 1 to about 15 carbon atoms, including both saturated and unsaturated aliphatic compunds. Examples include, but are not limited to, C1 to C15, preferably C1 to C10 alkanes, alkenes, or alkynes such as methane, ethane, propane, butane, pentane, hexane, ethylene, propylene, butylene, cyclohexane, pentene, acetylene. Also, C1 to C8 aromatics such as benzene, styrene, methylstyrene, and the like may be employed. As is known in the art, such hydrocarbon groups may be unsubstituted or substituted so long as they are capable of forming a plasma. Various combinations of different hydrocarbons may also be used.

The use of C1 to C4 hydrocarbons for the purpose of carbon-coating substrates is advantageous for its controllability in terms of thickness, deposition rate, hardness, etc. However, with respect to hydrogel materials, the C4 to C8 hydrocarbons (for example, butane, butene, isobutylene, and 1,3-butadiene) are preferred, at least with respect to hydrogel-forming substrates, due to the relative less flexibility of coatings made from C1 to C3 hydrocarbons such as methane. Such coatings may suffer during the expansion of the hydrogel substrate in water or saline and are more prone to cracking, which is less desirable. The use of longer carbon chains in the deposition plasma gas results in coatings that are more flexible. The longer carbon chain coatings have been found to be more expandable, especially when coating hydrogel substrates in saline or water.

It has been found that, at least with respect to silicone hydrogels, the use of diolefins such as 1,3-butadiene or isoprene are particularly preferred, resulting in coatings that are more flexible and expandable in water. More flexible coatings are especially preferred for "high-water" lenses that expand considerably upon hydration.

The hydrocarbon coating can be deposited from plasma, for example, in a low-pressure atmosphere (about 0.001 to 5 torr) at a radio frequency of 13.56 Mhz, at about 10 to 1000 watts, preferably 20–400 watts in about 30 seconds to 10 minutes or more, more preferably 30 seconds to 3 minutes. Other plasma conditions may be suitable as will be understood by the skilled artisan, for example, using pulsed plasma.

If the hydrocarbon coating provided is too thick, it can cause a haziness, resulting in a cloudy lens. Furthermore, excessively thick coatings can interfere with lens hydration due to differences in expansion between the lens and the coating, causing the lens to rip apart. Therefore, the thickness of the hydrocarbon layer should be less than about 500 Angstroms, preferably between about 25 and 500 Angstroms, more preferably 50 to 200 Angstroms, as determined by XPS analysis.

There are various ways to attach a polymer chain to a carbon layer, including plasma oxidation or other means to provide surface reactive functional groups that can react with the polymer. Preferably, a nitrogen-containing gas is used to form amine groups on the carbon layer. (However, oxygen or sulfur containing gases may alternatively be used to form oxygen or sulfur containing groups, for example hydroxy or sulfide groups or radicals, on the carbon layer.) Thus, the carbon layer is rendered reactive (functionalized) to promote the covalent attachment of the hydrophilic polymer to the surface.

To create a reactive functional group on the carbon layer, such an oxidation preferably utilizes a gas composition comprising an oxidizing media such as ammonia, ethylene diamine, C1 to C8 alkyl amine, hydrazine, or other oxidizing compounds. Preferably, the oxidation of the hydrocarbon layer is performed for a period of about 10 seconds to 10 minutes or more, more preferably 1 to 10 minutes, a discharge frequency of 13.56 Mhz at about 10 to 1000 watts, preferably 20 to 500 watts and about 0.1 to 1.0 torr. The lens substrate may be treated on both sides at once or each side sequentially.

The hydrophilic reactive polymer may be the reaction product of monomers comprising one or more non-reactive hydrophilic monomers and one or more reactive functional monomers. In this case, the reactive functional monomeric unit will complementarily react with a surface having reactive functionalities, for example, as provided by plasma oxidation. Such reactive functional monomers may include monomers containing one or more of the following groups: cyanate (—CNO), or various ring-opening reactive groups, for example, azlactone, epoxy, acid anhydrides, and the like.

The hydrophilic reactive polymers may be homopolymers or copolymers comprising reactive monomeric units that contain either an isocyanate or a ring-opening reactive functionality optionally. Although these reactive monomeric units may also be hydrophilic, the hydrophilic reactive polymer may also be a copolymer of reactive monomeric units copolymerized with one or more of various non-reactive hydrophilic monomeric units. Lesser amounts of hydrophobic monomeric units may optionally be present in the hydrophilic polymer, and in fact may be advanatageous in providing a thicker coating by promoting the aggregation of the hydrophilic reactive polymer in solution. The ring-opening monomers include azlactone-functional, epoxy-functional and acid-anhydride-functional monomers.

Mixtures of hydrophilic reactive polymers may be employed. For example, the hydrophilic polymer chains attached to the carbonaceous layer may be the result of the reaction of a mixture of polymers comprising (a) a first hydrophilic reactive polymer having reactive functionalities in monomeric units along the hydrophilic polymers complementary to reactive functionalities on the carbonaceous layer and, in addition, (b) a second hydrophilic reactive polymer having supplemental reactive functionalities that are reactive with the first hydrophilic reactive polymer. A mixture comprising an epoxy-functional polymer with an acid-functional polymer, either simultaneously or sequentially applied to the substrate to be coated, have been found to provide relatively thick coatings.

Preferably the hydrophilic reactive polymers comprise 1 to 100 mole percent of reactive monomeric units, more preferably 5 to 50 mole percent, most preferably 10 to 40 mole percent. The polymers may comprise 0 to 99 mole percent of non-reactive hydrophilic monomeric units, preferably 50 to 95 mole percent, more preferably 60 to 90 mole percent (the reactive monomers, once reacted may also be hydrophilic, but are by definition mutually exclusive with the monomers referred to as hydrophilic monomers which are non-reactive). Other monomeric units which are hydrophobic optionally may also be used in amounts up to about 35 mole percent, preferably 0 to 20 mole percent, most preferably 0 to 10 mole percent. Examples of hydrophobic monomers are alkyl methacrylate, fluorinated alkyl methacrylates, long-chain acrylamides such as octyl acrylamide, and the like. Hydrophilic monomers may be aprotic types such as acrylamides (N,N-dimethylacrylamide, DMA), lactones such as N-vinylpyrrolidinone, and poly (alkylene oxides) such as methoxypolyoxyethylene methacrylates or may be protic types such as methacrylic acid or hydroxyalkyl methacrylates such as hydroxyethyl methacrylate. Hydrophilic monomers may also include zwitterions such as N,N-dimethyl-N-methacryloxyethyl-N-(3-sulfopropyl)-ammonium betain (SPE) and N,N-dimethyl-N-methacrylamidopropyl-N-(3-sulfopropyl)-ammonium betain (SPP).

The weight average molecular weight of the hydrophilic reactive polymer may suitably range from about 200 to 1,000,000, preferably from about 1,000 to 500,000, most preferably from about 5,000 to 100,000.

As mentioned above, the hydrophilic reactive polymer may comprise monomeric units derived from azlactone-functional, epoxy-functional and acid-anhydride-functional monomers. For example, an epoxy-functional hydrophilic reactive polymer for coating a lens can be a copolymer containing glycidyl methacrylate (GMA) monomeric units which will react with amine reactive functionalities or the like on the carbon layer. Preferred examples of anhydride-functional hydrophilic reactive polymers comprise monomeric units derived from monomers such as maleic anhydride and itaconic anhydride.

In general, epoxy-functional reactive groups or anhydride-functional reactive groups in the hydrophilic reactive polymer react with the primary amine ($-NH_2$) groups or other reactive functionalities formed by plasma-oxidation on the carbon layer. Although amine reactive functionalities are preferred, oxygen-containing groups may be employed, preferably in the presence of an acidic catalyst such as 4-dimethylaminopyridine, to speed the reaction at room temperature, as will be understood by the skilled chemist. In general, azlactone or isocyanate-functional groups in the hydrophilic reactive polymers may similarly react with amines or hydroxy radicals, or the like, on the carbon layer.

In the preferred embodiment of the invention, preformed (non-polymerizable) hydrophilic polymers containing repeat units derived from at least one ring-opening monomer or isocyanate-containing monomer are covalently reacted with reactive groups on the surface of the medical device such as a contact lens substrate. Typically, the hydrophilic reactive polymers are attached to the substrate at one or more places along the chain of the polymer. After attachment, any unreacted reactive functionalities in the hydrophilic reactive polymer may be hydrolyzed to a non-reactive moiety.

Suitable hydrophilic monomers for comprising the hydrophilic reactive polymers include generally water soluble conventional vinyl monomers such as acrylates and methacrylates of the general structure:

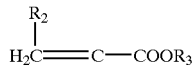

where $R_2$ is hydrogen or methyl and $R_3$ is hydrogen or is an aliphatic hydrocarbon group of up to 10 carbon atoms substituted by one or more water solubilizing groups such as carboxy, hydroxy, amino, lower alkylamino, lower dialkyamino, a polyethylene oxide group with from 2 to about 100 repeating units, or substituted by one or more sulfate, phosphate sulfonate, phosphonate, carboxamido, sulfonamido or phosphonamido groups, or mixtures thereof, Preferably $R_3$ is an oligomer or polymer such as polyethylene glycol, polypropylene glycol, poly(ethylene-propylene) glycol, poly(hydroxyethyl methacrylate), poly (dimethyl acrylamide), poly(acrylic acid), poly(methacrylic acid), polysulfone, poly(vinyl alcohol), polyacrylamide, poly(acrylamide-acrylic acid) poly(styrene sulfonate) sodium salt, poly(ethylene oxide), poly(ethylene oxide-propylene oxide), poly(glycolic acid), poly(lactic acid), poly (vinylpyrrolidone), cellulosics, polysaccharides, mixtures thereof, and copolymers thereof;

acrylamides and methacrylamides of the formula

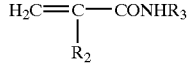

where $R_2$ and $R_3$ are as defined above;
acrylamides and methacrylamides of the formula

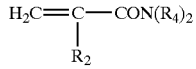

where $R_4$ is lower alkyl of 1 to 3 carbon atoms and $R_2$ is as defined above;
maleates and furmarates of the formula:

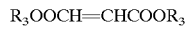

wherein $R_3$ is as defined above;
vinyl ethers of the formula

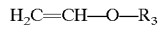

where $R_3$ is as defined above;
aliphatic vinyl compounds of the formula

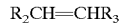

where $R_2$ is as defined above and $R_3$ is as defined above with the provise that $R_3$ is other than hydrogen; and
vinyl substituted heterocycles, such as vinyl pyridines, piperidines and imidazoles and N-vinyl lactams, such as N-vinyl-2-pyrrolidone.

Included among the useful water soluble monomers are: 2-hydroxyethyl-; 2- and 3-hydroxypropyl-; 2,3-dihydroxypropyl-; polyethoxyethyl-; and polyethoxypropylacrylates, methacrylates, acrylamides and methacrylamides; acrylamide, methacrylamide, N-methylacrylamide, N-methylmethacrylamide, N,N-dimethylacrylamide, N,N-dimethylmethacrylamide, N,N-dimethyl- and N,N-diethylaminoethyl acrylate and methacrylate and the corresponding acrylamides and methacrylamides; 2-and 4-vinylpyridine; 4-and 2-methyl-5-vinylpyridine; N-methyl-4-vinylpiperidine; 2-methyl-1-vinylimidazole; N,-N-dimethylallylamine; dimethylaminoethyl vinyl ether; N-vinylpyrrolidone; acrylic and methacrylic acid; itaconic, crotonic, fumaric and maleic acids and the lower hydroxyalkyl mono and diesters thereof, such as the 2-hydroxethyl fumarate and maleate, sodium acrylate and methacrylate; 2-methacryloyloxyethylsulfonic acid and allylsulfonic acid.

As mentioned above, hydrophobic monomers can be used, and may provide the benefit of causing the formation of dispersed polymer aggregates in solution, evidenced by a haziness in the solution of the polymer. Such aggregates can also be observed in Atomic Force Microscopy images of the coated medical device.

Suitable hydrophobic copolymerizable monomers include water insoluble conventional vinyl monomers such as; acrylates and methacrylates of the general formula

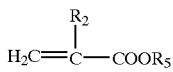

where $R_2$ is as defined above and $R_5$ is a straight chain or branched aliphatic, cycloaliphatic or aromatic group having up to 20 carbon atoms which is unsubstituted or substituted by one or more alkoxy, alkanoyloxy or alkyl of up to 12 carbon atoms, or by halo, especially chloro or preferably fluoro, C2 to C5 polyalkyleneoxy of 2 to about 100 units. or an oligomer such as polyethylene, poly(methyl methacrylate), poly(ethyl methacrylate), or poly(glycidyl methacrylate), mixtures thereof, and copolymers thereof;

acrylamides and methacylamides of the general formula

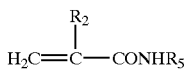

where $R_2$ and $R_5$ are defined above;
vinyl ethers of the formula

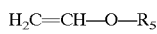

where $R_5$ is as defined above;
vinyl esters of the formula

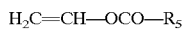

where $R_5$ is as defined above;
maleates and fumarates of the formula

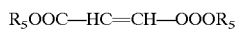

where $R_5$ is as defined above; and
vinylic substituted hydrocarbons of the formula

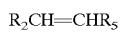

where $R_2$ and $R_5$ is as defined above

Suitable hydrophobic monomers include, for example: methyl, ethyl, propyl, isopropyl, butyl, ethoxyethyl, methoxyethyl, ethoxypropyl, phenyl, benzyl, cyclohexyl, hexafluoroisopropyl, or n-octyl-acrylates and -methacrylates as well as the corresponding acrylamides and methacrylamides; dimethyl fumarate, dimethyl maleate, diethyl fumarate, methyl vinyl ether, ethoxyethyl vinyl ether, vinyl acetate, vinyl propionate, vinyl benzoate, acrylonitrile, styrene, alpha-methylstyrene, 1-hexene, vinyl chloride, vinyl methylketone, vinyl stearate, 2-hexene and 2-ethylhexyl methacrylate.

The hydrophilic reactive polymers are synthesized in a manner known per se, from the corresponding monomers (the term monomer here also including a macromer) by a polymerization reaction customary to the person skilled in the art. Typically, the hydrophilic reactive polymers or chains are formed by: (1) mixing the monomers together; (2) adding a polymerization initiator; (3) subjecting the monomer/initiator mixture to a source of ultraviolet or actinic radiation and curing said mixture. Typical polymerization initiators include free-radical-generating polymerization initiators of the type illustrated by acetyl peroxide, lauroyl peroxide, decanoyl peroxide, coprylyl peroxide, benzoyl peroxide, tertiary butyl peroxypivalate, sodium percarbonate, tertiary butyl peroctoate, and azobis-isobutyronitrile (AIBN). Ultraviolet free-radical initiators illustrated by diethoxyacetophenone can also be used. The curing process will of course depend upon the initiator used and the physical characteristics of the comonomer mixture such as viscosity. In any event, the level of initiator employed will vary within the range of 0.01 to 2 weight percent of the mixture of monomers. Usually, a mixture of the above-mentioned monomers is warmed with addition of a free-radical former.

A polymerization to form the hydrophilic reactive polymer can be carried out in the presence of a solvent. Suitable solvents are in principle all solvents which dissolve the monomer used, for example water, alcohols such as lower alkanols, for example, ethanol and methanol; carboxamides such as dimethylformamide; dipolar aprotic solvents such as dimethyl sulfoxide or methyl ethyl ketone; ketones such as acetone or cyclohexanone; hydrocarbons such as toluene; ethers such as THF, dimethoxyethane or dioxane; halogenated hydrocarbons such astrichloroethane, and also mixtures of suitable solvents, for example mixtures of water and an alcohol, for example a water/ethanol or water/methanol mixture.

In a method according to the present invention, the carbon-coated contact lens or other medical device may be exposed to hydrophilic reactive polymers by immersing the substrate in a solution containing the polymers. For example, a contact lens may be placed or dipped for a suitable period of time in a solution of the hydrophilic reactive polymer or copolymer in a suitable medium, for example, an aprotic solvent such as acetonitrile.

As indicated above, the invention involves the attachment of reactive hydrophilic polymers to a siliconse medical device, which polymers comprise isocyanate-containing monomeric units or ring-opening monomeric units. In one embodiment of the present invention, the ring-opening reactive monomer has an azlactone group represented by the following formula:

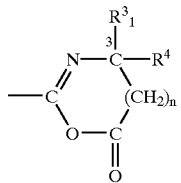

wherein $R^3$ and $R^4$ independently can be an alkyl group having 1 to 14 carbon atoms, a cycloalkyl group having 3 to 14 carbon atoms, an aryl group having 5 to 12 ring atoms, an arenyl group having 6 to 26 carbon atoms, and 0 to 3 heteroatoms non-peroxidic selected from S, N, and O, or $R^3$ and $R^4$ taken together with the carbon to which they are joined can form a carbocyclic ring containing 4 to 12 ring atoms, and n is an integer 0 or 1. Such monomeric units are disclosed in U.S. Pat. No. 5,177,165 to Valint et al.

The ring structure of such reactive functionalities is susceptible to nucleophilic ring-opening reactions with complementary reactive functional groups on the surface of the carbon layer or substrate being treated. For example, the azlactone functionality can react with primary amines, hydroxyl radicals or the like formed by plasma oxidation of the carbon layer, as mentioned above, to form a covalent bond between the substrate and the hydrophilic reactive polymer at one or more locations along the polymer. A plurality of attachments can form a series of polymer loops on the substrate, wherein each loop comprises a hydrophilic chain attached at both ends to the substrate.

Azlactone-functional monomers for making the hydrophilic reactive polymer can be any monomer, prepolymer, or oligomer comprising an azlactone functionality of the above formula in combination with a vinylic group on an unsaturated hydrocarbon to which the azlactone is attached. Preferably, azlactone-functionality is provided in the hydrophilic polymer by 2-alkenyl azlactone monomers. The 2-alkenyl azlactone monomers are known compounds, their synthesis being described, for example, in U.S. Pat. Nos. 4,304,705; 5,081,197; and 5,091,489 (all Heilmann et al.) the disclosures of which are incorporated herein by reference. Suitable 2-alkenyl azlactones include:

2-ethenyl-1,3-oxazolin-5-one,
2-ethenyl-4-methyl-1,3-oxazolin-5-one,
2-isopropenyl-1,3-oxazolin-5-one,
2-isopropenyl-4-methyl -1,3-oxazolin-5-one,
2-ethenyl-4,4-dimethyl-1,3-oxazolin-5-one,
2-isopropenyl-4,-dimethyl -1,3-oxazolin-5-one,
2-ethenyl-4-methyl-ethyl-1,3-oxazolin-5-one,
2-isopropenyl-4-methyl-4-butyl-1,3-oxazolin-5-one,
2-ethenyl-4,4-dibutyl-1,3-oxazolin-5-one,
2-isopropenyl-4-methyl-4-dodecyl-1,3-oxazolin-5-one,
2-isopropenyl-4,4-diphenyl-1,3-oxazolin-5-one,
2-isopropenyl-4,4-pentamethylene-1,3-oxazolin-5-one,
2-isopropenyl -4,4-tetramethylene-1,3-oxazolin-5-one,
2-ethenyl-4,4-diethyl-1,3-oxazolin-5-one,
2-ethenyl-4-methyl-4-nonyl-1,3-oxazolin-5-one,
2-isopropenyl-methyl-4-phenyl-1,3-oxazolin-5-one,
2-isopropenyl-4-methyl-4-benzyl-1,3-oxazolin-5-one, and
2-ethenyl-4,4-pentamethylene-1,3-oxazolin-5-one, More preferably, the azlactone monomers are a compound represented by the following general formula:

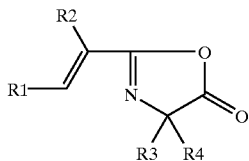

where $R^1$ and $R^2$ independently denote a hydrogen atom or a lower alkyl radical with one to six carbon atoms, and $R^3$ and $R^4$ independently denote alkyl radicals with one to six carbon atoms or a cycloalkyl radical with five or six carbon atoms. Specific examples include 2-isopropenyl-4,4-dimethyl-2-oxazolin-5-one (IPDMO), 2-vinyl-4,4-dimethyl-2-oxazolin-5-one (VDMO), spiro-4'-(2'-isopropenyl-2'-oxazolin-5-one) cyclohexane (IPCO), cyclohexane-spiro-4'-(2'-vinyl-2'-oxazol-5'-one) (VCO), and 2-(-1-propenyl)-4,4-dimethyl-oxazol-5-one (PDMO) and the like.

These compounds may be prepared by the general reaction sequence:

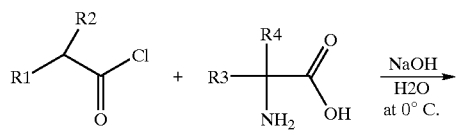

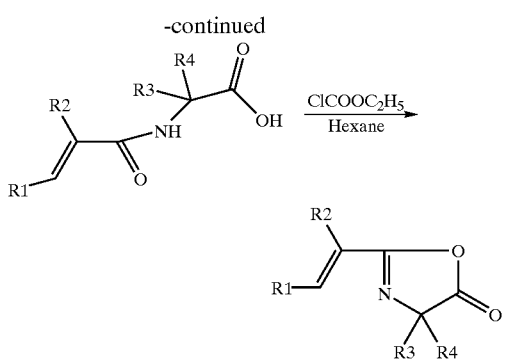

The first step is a Shotten-Bauman acylation of an amino acid. The polymerizable functionality is introduced by using either acryloyl or methacryloyl chloride. The second step involves a ring closure with a chloroformate to yield the desired oxazolinone. The product is isolated and purified by the usual procedures of organic chemistry.

As indicated above, the compounds can be copolymerized with hydrophilic and/or hydrophobic comonomers to form hydrophilic reactive polymers. After attachment to the desired substrate, any unreacted oxazolinone groups may then be hydrolyzed in order to convert the oxazolinone components into amino acids. In general, the hydrolysis step will follow the general reaction of:

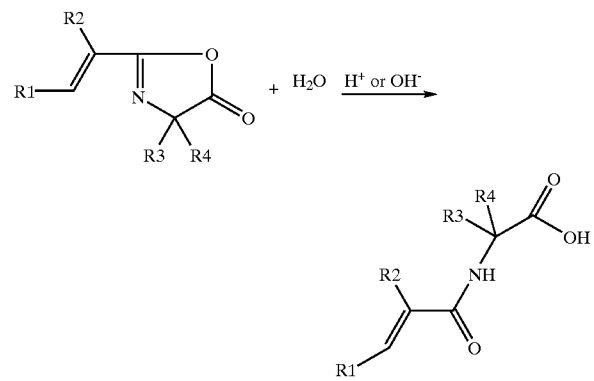

The carbon-carbon double bond between the $R^1$ and $R^2$ radicals is shown unreacted, but the reaction can take place when copolymerized into a polymer.

Non-limiting examples of comonomers useful to be copolymerized with azlactone functional moieties to form the hydrophilic reactive polymers used to coat a medical device include those mentioned above, preferably dimethylacrylamide, hydroxyethyl methacrylate (HEMA), and/or N-vinylpyrrolidone. Further examples of comonomers are disclosed in European Patent Publication 0 392 735, the disclosure of which is incorporated by reference. Preferably, dimethylacrylamide is used as a comonomer in order to impart hydrophilicity to the copolymer.

Such azlactone-functional monomers can be copolymerized with other monomers in various combinations of weight percentages. Using a monomer of similar reactivity ratio to that of an azlactone monomer will result in a random copolymer. Determination of reactivity ratios for copolymerization are disclosed in Odian, *Principles of Polymerization*, 2nd Ed., John Wiley & Sons, p. 425–430 (1981), the disclosure of which is incorporated by reference herein. Alternatively, use of a comonomer having a higher reactivity to that of an azlactone will tend to result in a block copolymer chain with a higher concentration of azlactone-functionality near the terminus of the chain.

Although not as preferred as monomers, azlactone-functional prepolymers or oligomers having at least one free-radically polymerizable site can also be utilized for providing azlactone-functionality in the hydrophilic reactive polymer according to the present invention. Azlactone-functional oligomers, for example, are prepared by free radical polymerization of azlactone monomers, optionally with comonomers as described in U.S. Pat. Nos. 4,378,411 and 4,695,608, incorporated by reference herein. Non-limiting examples of azlactone-functional oligomers and prepolymers are disclosed in U.S. Pat. Nos. 4,485,236 and 5,081,197 and European Patent Publication 0 392 735, all incorporated by reference herein.

In another embodiment of the invention, the ring-opening reactive group in the hydrophilic reactive polymer is an epoxy functionality. The preferred epoxy-functional monomer is an oxirane-containing monomer such as glycidyl methacrylate, 4-vinyl-1-cyclohexene-1,2-epoxide, or the like, although other epoxy-containing monomers may be used. Exemplary comonomers are N,N-dimethylacrylamide and fluorinated monomers such as octafluoropentyl-methacrylate.

In another aspect of the present invention, certain copolymers are disclosed as described above, which have been found to be useful for coating applications. Such copolymers comprise about 5 to 50 percent of monomeric units derived from functionally reactive monomers selected from the group consisting of epoxy, azlactone, and anhydride containing monomers and 50 to 95 mole percent of monomeric units derived from non-reactive hydrophilic monomers selected from the group consisting of acrylamides, lactones, poly(alkyleneoxy)methacrylates, methacrylic acid or hydroxyalkyl methacrylates, wherein the alkyl or alkylene groups have 1 to 6 carbon atoms. As indicated above, copolymers further comprising 0.5 to 35 percent of monomeric units derived from hydrophobic monomers may provide dispersed polymer aggregates in solution in order to provide thicker or denser coatings.

The hydrophilic reactive polymers are attached to silicone medical devices which device may be made by conventional manufacturing processes. For example, contact lenses for application of the present invention can be manufactured employing various conventional techniques, to yield a shaped article having the desired posterior and anterior lens surfaces. Spincasting methods are disclosed in U.S. Pat. Nos. 3,408,429 and 3,660,545; preferred static casting methods are disclosed in U.S. Pat. Nos. 4,113,224 and 4,197,266. Curing of the monomeric mixture is often followed by a machining operation in order to provide a contact lens having a desired final configuration. As an example, U.S. Pat. No. 4,555,732 discloses a process in which an excess of a monomeric mixture is cured by spincasting in a mold to form a shaped article having an anterior lens surface and a relatively large thickness. The posterior surface of the cured spincast article is subsequently lathe cut to provide a contact lens having the desired thickness and posterior lens surface. Further machining operations may follow the lathe cutting of the lens surface, for example, edge-finishing operations.

After producing a lens having the desired final shape, it is desirable to remove residual solvent from the lens before edge-finishing operations. This is because, typically, an organic diluent is included in the initial monomeric mixture in order to minimize phase separation of polymerized products produced by polymerization of the monomeric mixture and to lower the glass transition temperature of the reacting polymeric mixture, which allows for a more efficient curing process and ultimately results in a more uniformly polymerized product. Sufficient uniformity of the initial monomeric mixture and the polymerized product are of particular concern for silicone hydrogels, primarily due to the inclusion of silicone-containing monomers which may tend to separate from the hydrophilic comonomer. Suitable organic diluents include, for example, monohydric alcohols, with $C_6$-$C_{10}$ straight-chained aliphatic monohydric alcohols such as n-hexanol and n-nonanol being especially preferred; diols such as ethylene glycol; polyols such as glycerin; ethers such as diethylene glycol monoethyl ether; ketones such as methyl ethyl ketone; esters such as methyl enanthate; and hydrocarbons such as toluene. Preferably, the organic diluent is sufficiently volatile to facilitate its removal from a cured article by evaporation at or near ambient pressure. Generally, the diluent is included at five to sixty percent by weight of the monomeric mixture, with ten to fifty percent by weight being especially preferred.

The cured lens is then subjected to solvent removal, which can be accomplished by evaporation at or near ambient pressure or under vacuum. An elevated temperature can be employed to shorten the time necessary to evaporate the diluent. The time, temperature and pressure conditions for the solvent removal step will vary depending on such factors as the volatility of the diluent and the specific monomeric components, as can be readily determined by one skilled in the art. According to a preferred embodiment, the temperature employed in the removal step is preferably at least 50° C., for example, 60 to 80° C. A series of heating cycles in a linear oven under inert gas or vacuum may be used to optimize the efficiency of the solvent removal. The cured article after the diluent removal step should contain no more than twenty percent by weight of diluent, preferably no more than five percent by weight or less.

Following removal of the organic diluent, the lens is next subjected to mold release and optional machining operations. The machining step includes, for example, buffing or polishing a lens edge and/or surface. Generally, such machining processes may be performed before or after the article is released from a mold part. Preferably, the lens is dry released from the mold by employing vacuum tweezers to lift the lens from the mold, after which the lens is transferred by means of mechanical tweezers to a second set of vacuum tweezers and placed against a rotating surface to smooth the surface or edges. The lens may then be turned over in order to machine the other side of the lens.

Subsequent to the mold release/machining operations, the lens is subjected to surface treatment according to the present invention, as described above, including the plasma polymerization to form a carbon layer and the subsequent attachment of hydrophilic reactive polymer chains.

Plasma treatment involves passing an electrical discharge through a gas at low pressure, preferably at radio frequency (typically, 13.56 MHz). As mentioned above, this electrical discharge is absorbed by atoms and molecules in their gas state, thus forming a plasma that interacts with the surface of the contact lens.

After initiation by a low energy discharge, collisions between energetic free electrons present in the plasma cause the formation of ions, excited molecules, and free-radicals. Such species, once formed, can react with themselves in the gas phase as well as with further ground-state molecules. The plasma treatment may be understood as an energy dependent process involving energetic gas molecules. For chemical reactions to take place at the surface of the lens, one needs the required species (element or molecule) in terms of charge state and particle energy. Radio frequency plasmas generally produce a distribution of energetic species. Typically, the "particle energy" refers to the average of the so-called Boltzman-style distribution of energy for the energetic species. In a low-density plasma, the electron energy distribution can be related by the ratio of the electric field strength sustaining the plasma to the discharge pressure (E/p). The plasma power density P is a function of the wattage, pressure, flow rates of gases, etc., as will be appreciated by the skilled artisan. Background information on plasma technology, hereby incorporated by reference, includes the following: A. T. Bell, Proc. Intl. Conf. Phenom. Ioniz. Gases, "Chemical Reaction in Nonequilibrium Plasmas", 19–33 (1977); J. M. Tibbitt, R. Jensen, A. T. Bell, M. Shen, Macromolecules, "A Model for the Kinetics of Plasma Polymerization", 3, 648–653 (1977); J. M. Tibbitt, M. Shen, A. T. Bell, J. Macromol. Sci.-Chem., "Structural Characterization of Plasma-Polymerized Hydrocarbons", A10, 1623–1648 (1976); C. P. Ho, H. Yasuda, J. Biomed, Mater. Res., "Ultrathin coating of plasma polymer of methane applied on the surface of silicone contact lenses", 22, 919–937 (1988); H. Kobayashi, A. T. Bell, M. Shen, Macromolecules, "Plasma Polymerization of Saturated and Unsaturated Hydrocarbons", 3, 277–283 (1974); R. Y. Chen, U.S. Pat. No., 4,143,949, Mar. 13, 1979, "Process for Putting a Hydrophilic Coating on a Hydrophobic Contact lens"; and H. Yasuda, H. C. Marsh, M. O. Bumgarner, N. Morosoff, J. of Appl. Poly. Sci., "Polymerization of Organic Compounds in an Electroless Glow Discharge. VI. Acetylene with Unusual Co-monomers", 19, 2845–2858 (1975).

Based on this previous work in the field of plasma technology, the effects of changing pressure and discharge power on the rate of plasma modification can be understood. The rate generally decreases as the pressure is increased. Thus, as pressure increases the value of E/p, the ratio of the electric field strength sustaining the plasma to the gas pressure decreases and causes a decrease in the average electron energy. The decrease in electron energy in turn causes a reduction in the rate coefficient of all electron-molecule collision processes. A further consequence of an increase in pressure is a decrease in electron density. Providing that the pressure is held constant, there should be a linear relationship between electron density and power.

In practice, contact lenses are surface-treated by placing them, in their unhydrated state, within an electric glow discharge reaction vessel (e.g., a vacuum chamber). Such reaction vessels are commercially available. The lenses may be supported within the vessel on an aluminum tray (which acts as an electrode) or with other support devices designed to adjust the position of the lenses. The use of a specialized support devices which permit the surface treatment of both sides of a lens are known in the art and may be used in the present invention.

Subsequent to the plasma processing of the lens, the carbon coated lens are immersed in a solution containing the hydrophilic reactive polymers, as mentioned above. The Examples below provide the Applicants' best mode for forming the coating on a silicone lens or other medical device.

Subsequent to surface treatment, the lens may be subjected to extraction to remove residuals in the lenses. Generally, in the manufacture of contact lenses, some of the monomer mix is not fully polymerized. The incompletely polymerized material from the polymerization process may affect optical clarity or may be harmful to the eye. Residual material may include solvents not entirely removed by the previous solvent removal operation, unreacted monomers from the monomeric mixture, oligomers present as by-products from the polymerization process, or even additives that may have migrated from the mold used to form the lens.

Conventional methods to extract such residual materials from the polymerized contact lens material include extraction with an alcohol solution for several hours (for extraction of hydrophobic residual material) followed by extraction with water (for extraction of hydrophilic residual material). Thus, some of the alcohol extraction solution remains in the polymeric network of the polymerized contact lens material, and should be extracted from the lens material before the lens may be worn safely and comfortably on the eye. Extraction of the alcohol from the lens can be achieved by employing heated water for several hours. Extraction should be as complete as possible, since incomplete extraction of residual material from lenses may contribute adversely to the useful life of the lens. Also, such residuals may impact lens performance and comfort by interfering with optical clarity or the desired uniform hydrophilicity of the lens surface. It is important that the selected extraction solution in no way adversely affects the optical clarity of the lens. Optical clarity is subjectively understood to be the level of clarity observed when the lens is visually inspected.

Subsequent to extraction, the lens is subjected to hydration in which the lens is fully hydrated with water, buffered saline, or the like. When the lens is ultimately fully hydrated (wherein the lens typically may expand by 10 to about 20 percent or more), the coating remains intact and bound to the lens, providing a durable, hydrophilic coating which has been found to be resistant to delamination.

Following hydration, the lens may undergo cosmetic inspection wherein trained inspectors inspect the contact lenses for clarity and the absence of defects such as holes, particles, bubbles, nicks, tears. Inspection is preferably at 10×magnification. After the lens has passed the steps of cosmetic inspection, the lens is ready for packaging, whether in a vial, plastic blister package, or other container for maintaining the lens in a sterile condition for the consumer. Finally, the packaged lens is subjected to sterilization, which sterilization may be accomplished in a conventional autoclave, preferably under an air pressurization sterilization cycle, sometimes referred to as an air-steam mixture cycle, as will be appreciated by the skilled artisan. Preferably the autoclaving is at 100° C. to 200° C. for a period of 10 to 120 minutes. Following sterilization, the lens dimension of the sterilized lenses may be checked prior to storage.

Objects and advantages of this invention are further illustrated by the following examples, but the particular materials and amounts thereof recited in these examples, as well as other conditions and details should not be construed at unduly limit this invention.

EXAMPLE 1

This example discloses a representative silicone hydrogel lens material used in the following Examples as a coating substrate. The formulation for the material is provided in Table 1 below.

TABLE 1

| Component | Parts by Weight |
| --- | --- |
| TRIS-VC | 55 |
| NVP | 30 |
| $V_2D_{25}$ | 15 |

TABLE 1-continued

| Component | Parts by Weight |
| --- | --- |
| VINAL | 1 |
| n-nonanol | 15 |
| Darocur | 0.2 |
| tint agent | 0.05 |

The following materials are designated above:

TRIS-VC tris(trimethylsiloxy)silylpropyl vinyl carbamate

NVP N-vinyl pyrrolidone $V_2D_{25}$ a silicone-containing vinyl carbonate as previously described in U.S. Pat. No. 5,534,604.

VINAL N-vinyloxycarbonyl alanine

Darocur Darocur-1173, a UV initiator tint agent 1,4-bis[4-(2-methacryloxyethyl)phenylamino] anthraquinone Employing this material, a typical process for preparing a contact lens prior to its surface modification according to the present invention is as follows. Silicone hydrogel lenses made of the above formulation were cast-molded from polypropylene molds. Under an inert nitrogen atmosphere, 45-μl of the formulation was injected onto a clean polypropylene concave mold half and covered with the complementary polypropylene convex mold half The mold halves were compressed at a pressure of 70 psi, and the mixture was cured for about 15 minutes in the presence of UV light (6–11 mW/cm² as measured by a Spectronic UV meter). The mold was exposed to UV light for about 5 additional minutes. The top mold half was removed and the lenses were maintained at 60° C. for 3 hours in a forced air oven to remove n-nonanol. Subsequently, the lens edges were ball buffed for 10 seconds at 2300 rpm with a force of 60 g.

EXAMPLE 2

Table 2 below represents a polyurethane silicone hydrogel formulation used in the following examples as a coating substrate.

TABLE 2

| Component | Parts by Weight |
| --- | --- |
| Urethane crosslinking resin | 55 |
| TRIS | 20 |
| DMA | 25 |
| UV Absorber | 0.5 |
| n-Hexanol | 12 |
| Irgacure-819 | 0.5 |
| IMVT | 150 ppm |

The following materials are designated above:

TRIS tris(trimethylsiloxy)silyipropyl methacrylate

DMA N,N-dimethylacrylamide

Urethane a silicone-containing crosslinking resin as previously described in U.S. Pat. No. 5,034,461.

Irgacure-819 a UV initiator

IMVT a tint agent, namely 1,4-bis[4-(2-methacryloxyethyl)phenylamino] anthraquinone

EXAMPLE 3

Table 3 below represents a polyfumarate silicone hydrogel formulation used to make a lens in the following examples as a coating substrate.

TABLE 3

| Component | Parts by Weight |
| --- | --- |
| $F_2D_{20}$ | 20 |
| TRIS | 40 |
| DMA | 40 |
| n-Hexanol | 5 |
| DAROCUR-1173 | 0.5 |
| IMVT | 150 ppm |

The following materials are designated above:

TRIS tris(trimethylsiloxy)silyipropyl methacrylate

DMA N,N-dimethylacrylamide $F_2D_{20}$ a silicone-containing crosslinking resin as previously described in U.S. Pat. Nos. 5,374,662 and 5,496,871.

Darocur a UV initiator

IMVT a tint agent, namely 1,4-bis[4-(2-methacryloxyethyl)phenylamino] anthraquinone

EXAMPLE 4

This Example illustrates the synthesis of a prepolymer of N,N-dimethylacrylamide that is used in making a macromonomer for eventual use in the reactive hydrophilic polymer, which prepolymer is made according to the following reaction scheme.

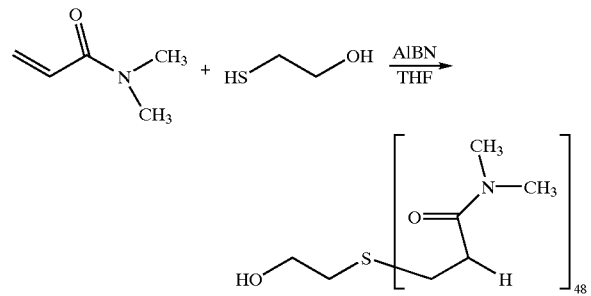

Reagents DMA (200 g, 2.0 moles), mercaptoethanol (3.2 g, 0.041 moles), AIBN (Vazo-64) in the amount 3.3 g, 0.02 moles, and tetrahydrofuran (1,000 ml) were combined in a two liter round-bottom flask fitted with a magnetic stirrer, condenser, thermal controller, and nitrogen inlet. Nitrogen gas was bubbled through the solution for one-half hour. The temperature was increased to 60° C. for 72 hours under a passive blanket of nitrogen. The polymer was precipitated from the reaction mixture with 20 liters of ethyl ether (171.4 g of polymer was isolated). A sample submitted for SEC (size exclusion chromatography) analysis gave Mn=3711, Mw=7493 and Pd=2.02, wherein Pd is the polydispersity based on styrene standards.

EXAMPLE 5

This Example illustrates the synthesis of a macromer of DMA using the polymer of Example 4 which macromonomer is used to make the hydrophilic reactive polymers of Examples 6 and 8 below, which macromonomer (or "macromer") is made according to the following reaction scheme:

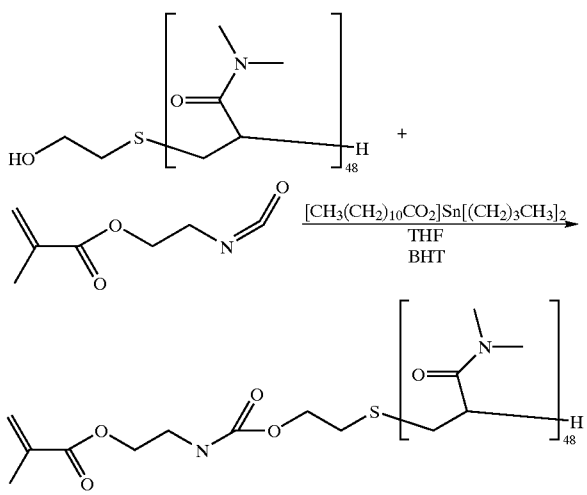

The polymer from Example 4 (150 g, 0.03 moles), isocyanatoethylmethacrylate (IEM, 5.6 g, 0.036 moles), dibutyltindilaurate (0.23 g, $3.6 \times 10^{-5}$ moles), tetrahydrofuran (THF, 1,000 ml) and 2,6-di-tert-butyl-4-methyl phenol (BHT, 0.002 g, $9 \times 10^{-6}$ moles were combined under a nitrogen blanket. The mixture was heated to 35° C. with good stirring for seven hours. Heating was stopped, and the mixture was allowed to stir under nitrogen overnight. Several ml of methanol were added to react with any remaining IEM. The macromonomer was then collected after precipitation from a large volume (16 liters) of ethyl ether. The solid was dried under house vacuum (yield 115 g). Size exclusion chromatography of the polymer verses polystyrene standards gave the following results: Mn=2249, Mw=2994 and Pd=1.33.

EXAMPLE 6

This Example illustrates the preparation of a DMA/DMA-mac/VDMO polymer which may be used to form a coating according to the present invention. Dimethylacrylamide (DMA) in the amount of 16 g (0.1614 mole), vinyl-4,4-dimethyl-2-oxazolin-5-one (VDMO) in the amount of 2 g (0.0144 mole), dimethylacrylamide macromer (DMA-mac) as prepared in Example 5, in the amount of 2 g (0.0004 mole), and 200 ml of toluene were placed in a 500-ml round-bottom flask equipped with a magnetic stirrer, condenser, argon blanket, and temperature controller. The solution was de-aerated with argon for 30 min, and then 0.029 g (0.1 mole %) of VAZO-64 was added and the reaction heated to 60° C. for 50 hrs. After the reaction was complete (monitored by FTIR), the solution was slowly added to 2500 ml of ethyl ether to precipitate the polymer. After the addition was complete, the mixture was stirred 10 min, allowed to settle 10 min, and filtered. The precipitate was dried under house vacuum at 30–35° C. overnight. The dried polymer was sampled for analysis by gel permeation chromatography, bottled, and stored in a desiccator.

EXAMPLE 7

This example illustrates the synthesis of the reactive co-polymer involving a 80/20 weight ratio of DMA/VDMO monomers employing the ingredients in Table 4 below:

TABLE 4

| Reagents | Amount Used | Moles |
|---|---|---|
| Dimethylacrylamide | 16 g | 0.1614 |
| Vinyl-4,4-dimethyl-2-oxazolin-5-one | 4 g | 0.0288 |
| VAZO-64 initiator | 0.031 g | $1.9 \times 10^{-4}$ |
| Toluene | 200 ml. | — |

All ingredients except VAZO-64 were placed in a 500-ml round-bottom flask equipped with a magnetic stirrer, condenser, argon blanket, and thermo-controller. The above was de-aerated with argon for 30 min After VAZO-64 was added, the solution was heated to 60° C. and maintained for 50 hrs. After the reaction was complete (monitored by FTIR), the solution was slowly added to 2500 m of diethyl ether to precipitate the polymer. The mixture was stirred 10 min., allowed to settle 10 min, and filtered. The precipitate was dried under vacuum at 30–35° C. overnight and the molecular weight determined to be Mn=19448, Mw=43548 and Pd=2.25.

EXAMPLE 8

This example illustrates a contact lens coated according to the present invention, wherein fumarate lenses (Example 3 above) were coated with a polymer containing dimethylacrylamide (DMA) and vinyl-4,4-dimethyl-2-oxazolin-5-one (VDMO). As described below, the fumarate was plasma treated (ammonia/butadiene/ammonia) and the amine formed on the carbon-coated fumarate lens surface reacted with the VDMO-containg polymer via a ring-opening mechanism.

Fully extracted, dry fumarate lenses were placed in a Branson RF plasma unit (13.56 MHz) on a tray which elevated the lenses between two electrodes and allowed the flow of gas around the lenses. The plasma unit was evacuated until the pressure reached 1.0 torr. Ammonia was introduced into the chamber at 1.0 torr for 1.0 minute, and the plasma was ignited at 100 watts for 20.0 seconds. After a 20-second ammonia plasma, the flow of ammonia was terminated and butadiene was introduced at 0.3 torr for 1.0 minute. The butadiene plasma was ignited at 100 watts for 30 seconds. Finally, the butadiene flow was stopped and ammonia was reintroduced at 1.0 torr for 1.0 minute. Another ammonia plasma was ignited for 20 seconds at 100 watts. The plasma-coated lenses were placed into an 1.0% (w/v) anhydrous acetonitrile solution of DMA/VDMO polymer overnight. The lenses were then equilibrated in HPLC grade water, heated to 80° C., cooled, placed in buffer borate and autoclaved (1 cycle—30 minutes at 121° C.).

The lenses at each step of the process were analyzed by X-ray Photoelectron Spectroscopy (XPS). The XPS data is obtained on a Physical Electronics [PFH] Model 5600. This instrument utilized a monochromatized A1 anode operated at 300 watts, 15 kV and 20 milliamps. The base pressure of this instrument was $2.0 \times 10^{-10}$ torr while the pressure during operation was $5.0 \times 10^{-8}$ torr. This instrument used a hemispherical energy analyzer. The instrument had an Apollo workstation with PHI 8503A version 4.0A software. The practical measure of sampling depth for this instrument at a sampling angle of 45° was 74 Å. Each specimen would be analyzed utilizing a low resolution survey spectra [0–1100 eV] to identify the elements present on the sample surface [10–100 Å]. High resolution spectra would be obtained on those elements detected from the low resolution survey scans. The elemental composition would be determined from the high resolution spectra. All data will be charged referenced to the carbon (CHx) peak at 285 eV. The atomic composition was calculated from the areas under the photoelectron peaks after sensitizing those areas with the instrumental transmission function and atomic cross sections for the orbital of interest. Since XPS does not detect the presence of hydrogen or helium, these elements will not be included in any calculation of atomic percentages.

The XPS analysis of the control lens received dry after wet processing detected carbon, oxygen, silicon and nitrogen. The results for the control lens, shown in Table 5 below, were typical for wet-processed fumarate lenses.

TABLE 5

|  | [C] | [O] | [N] | [F] | [Si] | [Na] |
| --- | --- | --- | --- | --- | --- | --- |
| Mean | 65.8 | 17.7 | 5.7 | 0.0 | 10.8 | 0.0 |
| Sd | 0.3 | 0.2 | 0.6 | 0.0 | 0.3 | 0.0 |

Lenses received dry after wet processing were ammonia plasma-treated for 20.0 seconds, at 100 watts and 1.0 torr. The low-resolution spectra detected carbon, oxygen, silicon and nitrogen, as shown in Table 6 below for the XPS analysis of ammonia plasma-treated lenses. Compared to the control, nitrogen and oxygen levels increased, carbon decreased, and silicon remained about the same in this run. Because all the nitrogen functionalities are unresolvable in the N "1s" unless it is charged, it was difficult to determine what type of nitrogen was incorporated at the surface.

TABLE 6

|  | [C] | [O] | [N] | [F] | [Si] | [Na] |
| --- | --- | --- | --- | --- | --- | --- |
| Mean | 62.0 | 18.8 | 9.0 | 0.0 | 10.2 | 0.0 |
| Sd | 1.1 | 0.7 | 0.8 | 0.0 | 0.8 | 0.0 |

The XPS low-resolution analysis of the ammonia/butadiene/ammonia plasma-treated fumarate lenses detected carbon, oxygen, silicon and nitrogen, as shown in Table 7 belw. The XPS data showed a decrease in silicon and an increase in nitrogen and carbon, which indicated a nitrogen/carbon containing coating had been applied to the surface of the silicon-containing fumarate lens material. It was noted that the nitrogen levels are different between the ammonia plasma-treated fumarate lens surface and the ammonia-plasma-treated carbon layer with the same plasma conditions. This is believed to be a good example of treating different surfaces with the same plasma conditions in which the end result is a different surface. The detection of 2.7% silicon puts the carbon layer thickness at between 5 and 6 nm.

TABLE 7

|  | [C] | [O] | [N] | [F] | [Si] | [Na] |
| --- | --- | --- | --- | --- | --- | --- |
| Mean | 78.2 | 7.8 | 11.5 | 0.0 | 2.7 | 0.0 |
| Sd | 2.3 | 1.6 | 1.4 | 0.0 | 1.5 | 0.0 |

The XPS analysis of the ammonia/butadiene/ammonia plasma-treated fumarate lens, after being soaked in a DMA/VDMO polymer from Example 7, is shown in Table 8 below. The low-resolution spectra detected carbon, oxygen, silicon, nitrogen and sodium for both sample sets.

TABLE 8

| Sample | | [C] | [O] | [N] | [F] | [Si] | [Na] |
| --- | --- | --- | --- | --- | --- | --- | --- |
| 1 | mean | 69.7 | 19.3 | 7.7 | 0.0 | 2.7 | 0.6 |
|  | sd | 1.8 | 0.7 | 1.1 | 0.0 | 0.5 | 0.5 |
| 2 | mean | 71.2 | 18.3 | 7.6 | 0.0 | 1.9 | 1.1 |
|  | Sd | 1.0 | 0.6 | 0.5 | 0.0 | 0.4 | 0.4 |

The XPS data showed a decrease in silicon and an increase in nitrogen which indicated a nitrogen-containing coating had been applied to the surface of the silicon-containing fumarate lens. The XPS Carbon 1s (C1s) spectra had a peak shape similar to DMA polymer. It would be difficult to tell if the lenses were coated with the polymer as opposed to the plasma-coated lenses except for the sodium and the carbon 1s spectra. The sodium appears because any unreacted VDMO in the polymer will ring open in the presence of water to form acid functionality. In borate buffer, this acid will complex with sodium revealing the presence of DMA/VDMO polymer at the surface. If this polymer were completely ring opened and complexed with sodium, there would be 2.4% sodium in the polymer. With about 1.0% sodium at the surface, approximately half of the VDMO remained unreacted with the surface. This calculation assumed the surface was all DMA/VDMO polymer.

In summary of the above XPS data, the silicon level at the lens surface for the control was 10.8%, after plasma treatment was 2.7%, and after the plasma-coated fumarate was coated with the DMA/VDMO polymer was an average of 2.4 percent. Of all the fumarate lens surfaces just mentioned, only the DMA/VDMO coated lenses had 1.0% sodium at the surface, associated with the ring-opened VDMO in the hydrophilic coating polymer. The XPS carbon is spectra of the polymer coated lens also revealed amide and amine functionality, from dimethylacrylamide, at the surface.

Atomic Force Microscopy (AFM) was employed to study the morphology of the contact lens surfaces. AFM works by measuring nano-scale forces ($10^{-9}$ N) between a sharp probe and atoms on the lens surface. The probe is mounted on a cantilever substrate. The deflection of the cantilever, measured by a laser detection system, is processed to generate height information. While gathering height information, the probe is rastered in the x-y plane to generate a three dimensional topographical image of the lens surface. In the optical zone of each lens, three images were sampled on both sides of the lens.

Figure 2:
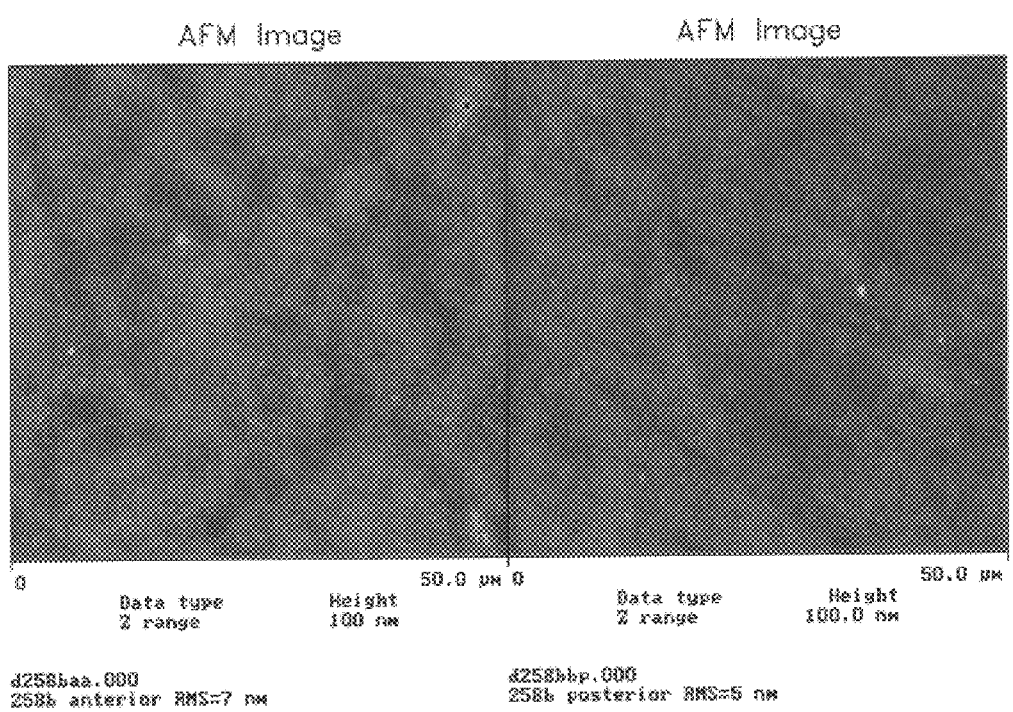
FIG. 2 shows Atomic Force Microscopy (AFM) topographical images (50 $\mu m^2$) of a contact lens coated described in Example 8 according to one embodiment of the present invention, which lens is a fumarate silicone hydrogel lens coated with a polymer containing dimethylacrylamide (DMA) and vinyl-4,4-dimethyl-2-oxazolin-5-one (VDMO).

AFM topographical images of a control lens is shown in FIG. 1. This control lens was received dry after wet processing and analyzed as received. The Atomic Force Microscopy (AFM) images were 50 μm² with the anterior (side of the lens) shown on the left and the posterior shown on the right. The lens surface topography of both surfaces showed lines replicated from the tool employed (the lines from the tool make the molds which make the lenses). The anterior also had pits, which may be from the tool or air bubble caught in the monomer mix. The Root Mean Square (RMS) roughness of the anterior lens surface was 4.1 nm +/−0.1 , and the posterior had an RMS roughness of 4.7 nm +/−0.3. Typical cast mold lenses have an RMS roughness of from 2–25 nm. The AFM images of the hydrophilc-polymer coated fumarate (an ammonia/ butadiene/ammonia plasma-treated fumarate lens soaked in a DMA/VDMO (80%/20%) polymer, fully processed, is shown in FIG. 2. The AFM images were again 50 um² with the anterior on the left and the posterior on the right. The images were taken towards the center of the lens. The topography looks like a control lens with a few features revealing a coating, and a stress/stretch feature with light vermiculation (wave-like surface with a 0.25–0.50 μm wavelength). As the coating becomes thicker, towards the edge, a heavier vermiculated topography appears. This vermiculated topography results from the carbon coating expanding in the acetonitrile solvent. The Root Mean Square (RMS) roughness of the anterior lens surface was 8.0 nm +/−3.4 and of the posterior surface was 5.3 nm +/−2.2, less than 25 nm as desired.

The water contact-angle of the lenses was measured on the control lens surface and on a DMA/VDMO polymer coated lens surface (8 measurements). Data from two other contact lens materials, both commercially available, were also included for comparison in the data Table 9 below. The lower the water contact angle, typically the more wettable or hydrophilic the lens surface.

TABLE 9

| Material | Water Contact Angle |
| --- | --- |
| Fumarate Lens Control | 105 |
| Fumarate DMA/VDMO Coated | 30 |
| HEMA (processed) | 65 |
| PureVision ® Balafilcon Lens | 85 |

In conclusion of the above, the fumarate lenses were successfully coated with a carbon coating followed by a DMA/VDMO polymer as shown by XPS, AFM and water contact angle analysis.

EXAMPLE 9

This Example illustrates the preparation of a DMA/DMA-mac/VDMO polymer. Dimethylacrylamide, 16 g (0.1614 mole), vinyl-4,4-dimethyl-2-oxazolin-5-one 2 g (0.0144 mole), and 2 g (0.0004 mole) of dimethylacrylamide macromer from Example 5 above, and 200 ml of toluene were placed in a 500-ml round-bottom flask equipped with a magnetic stirrer, condenser, argon blanket, and temperature controller. The solution was de-aerated with argon for 30 min Then 0.029 g (0.1 mole %) of VAZO-64 was added, and the reaction heated to 60° C. for 50 hr. After the reaction was complete (monitored by FTIR), the solution was slowly added to 2500 ml of ethyl ether. After the addition was complete, the mixture was stirred 10 min, allowed to settle 10 min, and filtered. The precipitate was dried under house vacuum at 30–35° C. overnight. The dried polymer was sampled for analysis by gel permeation chromatography, bottled and stored in a desiccator.

EXAMPLE 10

This Example illustrates the preparation of a DMA/PEOMA/VDMO polymer. Dimethylacrylamide 12 g (0.1211 mole), vinyl-4,4-dimethyl-2-oxazolin-5-one 4 g (0.0288 mole), PEO methacrylate 1000 in the amount of 4 g (0.0036 mole), and 200 ml of toluene were placed in a 500-ml round-bottom flask equipped with a magnetic stirrer, condenser, argon blanket and temperature controller. The solution was de-aerated with argon for 30 min Then 0.025 g (0.1 mole %) of VAZO-64 was added, and the reaction heated to 60° C. for 50 hrs. After the reaction was complete (monitored by FTIR), the solution was slowly added to 2500 ml of ethyl ether. After the addition was complete, the mixture was stirred 10 min, allowed to settle 10 min, and filtered. The precipitate was dried under house vacuum at 30–35° C. overnight. The dried polymer was sampled for analysis by gel permeation chromatography, bottled and stored in a desiccator.

EXAMPLE 11

This Example illustrates a process for the surface modification of a contact lens according to the present invention employing a linear DMA VDMO hydrophilic reactive polymer of Example 7. Silicone hydrogel lenses made of the formulation of Example 1 (Balafilicon A) above were made, which lens material was cast molded from polypropylene molds. The Balafilcon A lenses were coated with a copolymer containing dimethylacrylamide(DMA) and vinyl-4,4-dimethyl-2-oxazolin-5-one(VDMO) as follows. After solvent removal and extraction, the lenses were dried before treatment. The lenses were placed in a Branson RF plasma unit (13.56 MHz) on a tray which elevated the lenses between two electrodes and allowed the flow of gas around the lenses. The plasma unit was evacuated of air until the pressure reached 1.0 torr. Ammonia was introduced into the chamber at 1.0 torr for 1.0 minute, and the plasma was ignited at 100 watts for 20.0 seconds. The flow of ammonia was terminated and butadiene was introduced at 0.3 torr for 1.0 minute. The butadiene plasma was ignited at 100 watts for 60 seconds. Finally, the butadiene flow was stopped, and ammonia was reintroduced at 1.0 torr for 1.0 minute. Another ammonia plasma was ignited for 20 seconds at 100 watts. (The ammonia and butadiene gases were used as received from Rochester Welding Supply and were 99.9+% pure.)

The plasma coated lenses were placed into an 1.0% (w/v) anhydrous acetonitrile solution of DMA/VDMO polymer overnight. The anhydrous acetonitrile was used as received from Aldrich. The lenses were then equilibrated in HPLC grade water, heated to 80° C., cooled, placed in buffer borate, and autoclaved (1 cycle-30 minutes at 121° C.).

The lenses were analyzed by XPS (X-ray Photoelectron Spectroscopy), using the equipment describe above in Example 8. The XPS data is shown in the Table 10 below.

TABLE 10

|  |  | [C] | [O] | [N] | [Si] | [Na] |
| --- | --- | --- | --- | --- | --- | --- |
| Control-anterior | mean | 64.3 | 19.5 | 6.7 | 9.5 |  |
|  | SD | 0.4 | 0.3 | 0.2 | 0.2 |  |
| Control | mean | 64.0 | 19.7 | 7.0 | 9.3 |  |
| Posterior | SD | 0.6 | 0.4 | 0.3 | 0.5 |  |
| Plasma Treated | mean | 84.2 | 5.4 | 9.8 | 0.6 |  |
| Anterior Run 1 | SD | 0.6 | 0.4 | 0.2 | 0.3 |  |
| Plasma Treated | mean | 79.8 | 8.8 | 8.3 | 3.1 |  |
| Posterior Run 1 | SD | 1.8 | 1.0 | 0.2 | 0.7 |  |
| Plasma Treated | mean | 84.7 | 6.3 | 8.4 | 0.4 |  |
| Anterior Run 2 | SD | 0.3 | 0.1 | 0.2 | 0.2 |  |
| Plasma Treated | mean | 83.5 | 7.5 | 6.6 | 2.3 |  |
| Posterior Run 2 | SD | 1.9 | 1.3 | 0.6 | 1.0 |  |

TABLE 10-continued

|  |  | [C] | [O] | [N] | [Si] | [Na] |
|---|---|---|---|---|---|---|
| Coated Anterior Run 1 | mean | 71.5 | 19.0 | 7.6 | 0.7 | 1.2 |
|  | SD | 1.2 | 0.5 | 0.9 | 0.2 | 0.2 |
| Coated Posterior Run 1 | mean | 73.0 | 18.4 | 5.6 | 1.3 | 1.7 |
|  | SD | 1.9 | 1.7 | 0.8 | 0.5 | 0.6 |
| Coated Anterior Run 2 | mean | 70.2 | 19.7 | 7.4 | 1.4 | 1.3 |
|  | SD | 1.7 | 0.8 | 0.5 | 0.5 | 0.3 |
| Coated Posterior Run 2 | mean | 72.6 | 18.3 | 7.0 | 0.9 | 1.1 |
|  | SD | 0.6 | 0.1 | 0.2 | 0.2 | 0.4 |

As shown in Table 10, the control lenses, wet processed before plasma treatment, had a surface elemental composition of 64% carbon, 20% oxygen, 7% nitrogen and 9% silicon at the surface. Furthermore, the silicon level of the control lens went from 9.4% to within a range of 0.4 to 3.0% after plasma treatment. When the plasma-coated lens was coated with the VDMO/DMA copolymer, the silicon level then went to within a range of from 0.7 to 1.4%. The carbon level and the oxygen level clearly indicate the coating has been applied. The oxygen level increases and the carbon level decreases after the copolymer was coated onto the plasma-treated surface. This would be expected since DMA, which is 80% of the copolymer composition, has less molar carbon and more oxygen than an ammonia plasma treated carbon surface. The detection of sodium by XPS also confirms the presence of the DMA/VDMO polymer on fully processed lenses. The presence of sodium results from an association with an acid group formed from any VDMO in the polymer chain that did not react with the amine on the surface of the contact lens.

EXAMPLE 12

This Example illustrates a process for the surface modification of silicone hydrogel lenses made of the formulation of Example 1 (Balafilicon A) employing a DMA-mac/DMA/VDMO (10/70/20 weight ratio) hydrophilic reactive polymer of Example 6 above. Balafilicon A lenses were received after solvent removal and extraction and dried before treatment. The lenses were placed in a Branson RF plasma unit (13.56MHz) on a tray which elevated the lenses between two electrodes and allowed the flow of gas around the lenses. The plasma unit was evacuated until the pressure reached 0.2 torr, and ammonia was introduced into the chamber. The plasma was ignited at 450 watts for 60.0 seconds with a flow of 155 sccm. The flow of ammonia was terminated, and butadiene was introduced for 1.0 minute. The butadiene plasma was ignited at 325 watts for 60 seconds with a flow of 200 sccm. Finally, the butadiene flow was stopped, and ammonia was reintroduced. Another ammonia plasma was ignited for 60 seconds at 450 watts with a flow rate of 155 sccm. The plasma-coated lenses were placed into an 1.0% (w/v) anhydrous acetonitrile solution of the DMA macromer /DMA/VDMO polymer made in Example 6 above. The anhydrous acetonitrile was used as received from Aldrich. The lenses were then equilibrated in HPLC grade water, heated to 80° C., cooled, placed in borate buffered solution, and autoclaved (1 cycle for 30 minutes at 121° C.).

The lenses were examined before and after plasma by X-ray Photoelectron Spectroscopy (XPS) using the Physical Electronics [PHI] Model 5600 described in the previous Example 8. The XPS results for the lenses are shown in Table 11 below.

TABLE 11

|  |  | O1s | N1s | C1s | Si2p | Na1s |
|---|---|---|---|---|---|---|
| Control Anterior | Mean | 17.8 | 6.9 | 65.4 | 9.9 |  |
|  | sd | 0.7 | 0.1 | 0.3 | 0.3 |  |
| Control Posterior | mean | 17.6 | 6.6 | 66.1 | 9.7 |  |
|  | sd | 0.1 | 0.1 | 0.3 | 0.3 |  |
| After Plasma Anterior | mean | 8.2 | 16.1 | 73.8 | 1.8 |  |
|  | sd | 0.7 | 0.3 | 1.2 | 0.8 |  |
| After Plasma Posterior | mean | 8.6 | 17.8 | 73.6 | 0.0 |  |
|  | sd | 0.1 | 0.7 | 0.7 | 0.0 |  |
| Fully Processed Anterior | mean | 17.2 | 7.0 | 72.7 | 1.8 | 1.3 |
|  | sd | 0.9 | 1.1 | 2.5 | 0.5 | 0.5 |
| Fully Processed Posterior | mean | 16.9 | 7.4 | 72.7 | 1.5 | 1.5 |
|  | sd | 0.2 | 0.9 | 1.5 | 0.6 | 0.1 |

As shown by the data in the above Table 11, the control lenses (wet-processed before plasma treatment) had a surface elemental composition of 66% carbon, 18% oxygen, 7% nitrogen, and 10% silicon at the surface. After plasma treatment, the silicon level was between 0–1.8%. After the plasma-treated lens was coated with the ter-polymer, the silicon level was from 1.5–1.8%. The nitrogen level of a control lens surface was 6.7%, after plasma treatment was about 17%, and after the plasma-treated lens was coated with the ter-polymer was about 7.3%. It would be difficult to tell, from the silicon and/or nitrogen levels, if the lenses were coated with the ter-polymer because the silicon levels remain about constant between the plasma step and the fully processed step. The lens polymer, the plasma treated substrate, and the ter-polymer all contain nitrogen. However, the detection of sodium by XPS confirms the presence of the DMA macromer/DMA VDMO polymer at a fully processed lens surface. The polymer coated lenses had about 1.5% sodium at the surface, which sodium appears because any unreacted VDMO in the polymer will ring open in the presence of water to form acid functionality In borate buffer solution, the acid will complex with sodium revealing the presence of DMA-macromer/DMA/VDMO polymer at the surface. If this polymer were completely ring opened and complexed with sodium, there would be 2.4% sodium in the polymer. With about 1.5% sodium at the surface, over half of the VDMO remained unreacted with the surface. This calculation was, of course, assuming the surface was all DMA/VDMO polymer and the samples had been properly desalinated.

EXAMPLE 13

This Example illustrates the surface modification of silicone urethane hydrogel lenses made of the formulation of Example 2 employing a DMA/VDMO (80/20 weight ratio) polymer coating. Urethane lenses were received after solvent removal and extraction. The lenses were dried before treatment. The lenses were placed in a Branson RF plasma unit (13.56 MHz) on a tray which elevated the lenses between two electrodes and allowed the flow of gas around the lenses. The plasma unit was evacuated of air until the pressure reached 1.0 torr. Ammonia was introduced into the chamber at 1.0 torr for 1.0 minute, and the plasma was ignited at 100 watts for 20.0 seconds. The flow of ammonia was terminated, and butadiene was introduced at 0.4 torr for 1 minute. The butadiene plasma was ignited at 100 watts for 40 seconds. Finally, the butadiene flow was stopped and ammonia was reintroduced at 1.0 torr for 1.0 minute. Another ammonia plasma was ignited for 20 seconds at 100 watts. The plasma coated lenses were placed overnight into an 1.0% (w/v) anhydrous acetonitrile solution of the DMA VDMO polymer of Example 7 above. The lenses were then equilibrated in HPLC grade water, heated to 80° C., cooled, placed in Buffer Borate and autoclaved (I cycle for 30 minutes at 121° C.).

The XPS data was obtained employing the Physical Electronics [PHI] Model 5600 described in Example 8 above. The resulting XPS data is shown in Table 12 below.

TABLE 12

|  |  | [C] | [O] | [N] | [Si] |
|---|---|---|---|---|---|
| Control | mean | 57.3 | 22.1 | 2.6 | 18.0 |
|  | SD | 0.5 | 0.4 | 0.2 | 0.4 |
| After Plasma Anterior run 1 | mean | 69.7 | 17.0 | 10.5 | 2.8 |
|  | SD | 2.2 | 1.1 | 1.0 | 2.0 |
| After Plasma Posterior run 1 | mean | 66.2 | 18.9 | 4.8 | 10.1 |
|  | SD | 0.2 | 0.5 | 0.4 | 0.5 |
| After Plasma Anterior run 2 | mean | 69.5 | 17.9 | 10.3 | 2.3 |
|  | SD | 0.9 | 0.3 | 0.8 | 0.6 |
| After Plasma Posterior run 2 | mean | 63.7 | 20.1 | 4.2 | 11.9 |
|  | SD | 1.8 | 0.5 | 0.1 | 1.4 |
| Polymer Coated Anterior run 1 | mean | 66.4 | 22.2 | 6.1 | 5.3 |
|  | SD | 0.8 | 0.2 | 0.3 | 0.6 |
| Polymer-Coated Posterior run 1 | mean | 62.9 | 23.4 | 5.7 | 8.0 |
|  | SD | 2.2 | 0.9 | 0.7 | 2.2 |
| Polymer-Coated Anterior run 2 | mean | 65.5 | 22.3 | 7.0 | 5.3 |
|  | SD | 1.4 | 1.2 | 0.2 | 0.9 |
| Polymer-Coated Posterior run 2 | mean | 59.2 | 24.1 | 4.9 | 11.9 |
|  | SD | 0.5 | 0.4 | 0.5 | 0.7 |

The silicon level of a control urethane lens surface was 18.0%, 2.5% (average anterior) and 11.0% (average posterior) after plasma treatment and 5.3% (av. ant.) and 10.0% (av. post.) if the plasma coated urethane lens was coated with the DMA/VDMO polymer. Of all the urethane lens surfaces just mentioned, only the DMA/VDMO coated lenses had 1.0% sodium at the surface. The sodium results were recovered from the survey spectra, they were not run at high resolution. It would be difficult to tell if the lenses were coated with the polymer as opposed to the plasma-coated lenses except for the sodium. The sodium appears because any unreacted VDMO in the polymer will ring open in the presence of water to form acid functionality. In Buffered Borate Solution, this acid will complex with sodium revealing the presence of DMA/VDMO polymer at the surface. If this polymer were completely ring opened and complexed with sodium, there would be 2.4% sodium in the polymer. With about 1.0% sodium at the surface, over half of the VDMO remained reacted with the surface. This calculation was, of course, assuming the surface was all DMA/VDMO polymer and the samples had been properly desalinated. In conclusion, the urethane silicon lens was coated with a carbon coating followed by a DMA/VDMO polymer as shown by XPS.

EXAMPLE 14

This Example illustrates the synthesis of a hydrophilic reactive (linear) copolymer of DMA/GMA according to the following reaction scheme.

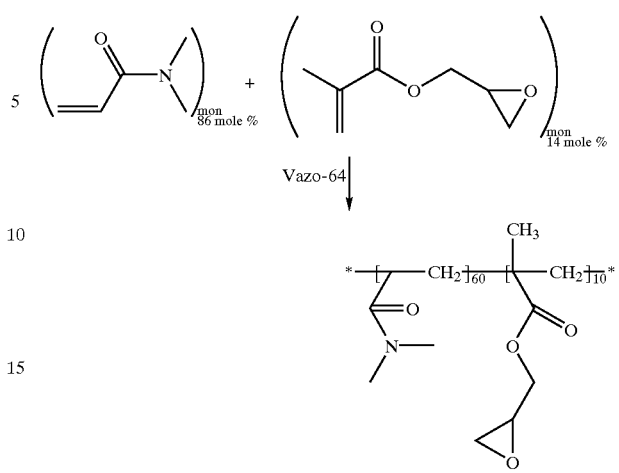

To a 1 liter reaction flask were added distilled N,N-dimethylacrylamide (DMA 48g, 0.48 moles), distilled glycidyl methacrylate (GM, 12 g, 0.08 moles), Vazo-64(AIBN, 0.096 g, 0.0006 moles) and toluene (600 ml). The reaction vessel was fitted with a magnetic stirrer, condenser, thermal controller and a nitrogen inlet. Nitrogen was bubbled through the solution for 15 minutes to remove any dissolved oxygen. The reaction flask was then heated to 60° C. under a passive blanket of nitrogen for 20 hours. The reaction mixture was then added slowly to 6 liter of ethyl ether with good mechanical stirring. The reactive polymer precipitated and was collected by vacuum filtration. The solid was placed in a vacuum oven at 30° C. overnight to remove the ether, leaving 50.1 g of reactive polymer (83% yield). The reactive polymer was placed in a desicciator for storage until use.

EXAMPLE 15

This Example illustrates the synthesis of another hydrophilic reactive polymer that may be employed to coat a silicone medical device. A brush (branched) hydrophilic polymer of N,N-dimethylacrylamide (DMA) monomer, DMA macromer, and glycidyl methacrylate was synthesized as follows. To a reaction flask were added distilled N,N-dimethylacrylamide (DMA, 32 g, 0.32 moles), DMA macromer from Example 5 in the amount of 4 g (0.0008 moles), distilled glycidyl methacrylate (GM, 4.1 g , 0.029 moles) Vazo-64 (AIBN, 0.06 g, 0.00037 moles), and toluene (500 ml). The reaction vessel was fitted with a magnetic stirrer, condenser, thermal controller and a nitrogen inlet. Nitrogen was bubbled through the solution for 15 min to remove any dissolved oxygen. The reaction flask was then heated to 60° C. under a passive blanket of nitrogen for 20 hours. The reaction mixture was then added slowly to 4 liter of ethyl ether with good mechanical stirring. The reactive polymer precipitated and was collected by vacuum filtration. The solid was placed in a vacuum oven at 30° C. overnight to remove the ether, leaving 33.2 g of reactive polymer (83% yield). The reactive polymer was placed in a desicciator for storage until use.

EXAMPLE 16

This example illustrates the synthesis of another epoxy-containing hydrophilic reactive polymer that may be employed to coat a lens substrate according to the present invention. The vinylpyrrrolidone-co-4-vinylcyclohexyl-1,2-epoxide polymer (NVP-co-VCH) was synthesized according to the following reaction scheme:

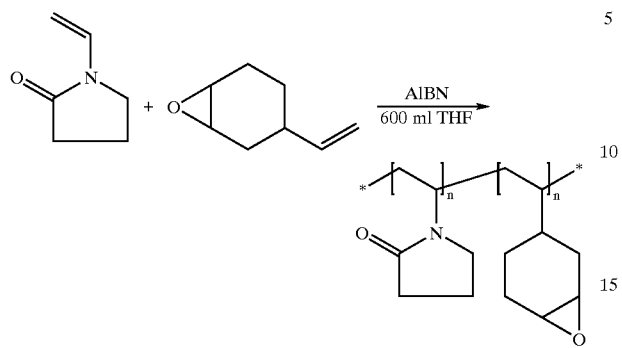

To a 1 liter reaction flask were added distilled N-vinylpyrrolidinone (NVP, 53.79 g, 0.48 moles), 4-vinylcyclohexyl-1,2-epoxide (VCHE, 10.43 g, 0.084 moles), Vazo-64 (AIBN, 0.05 g, 0.0003 moles) and THF (600 ml). The reaction vessel was fitted with a magnetic stirrer, condenser, thermal controller, and a nitrogen inlet. Nitrogen was bubbled through the solution for 15 minutes to remove any dissolved oxygen. The reaction flask was then heated to 60° C. under a passive blanket of nitrogen for 20 hrs. The reaction mixture was then added slowly to 6 liter of ethyl ether with good mechanical stirring. The copolymer precipitated and was collected by vacuum filtration. The solid was placed in a vacuum oven at 30° C. overnight to remove the ether, leaving 21 g of reactive polymer (32% yield). The hydrophilic reactive polymer was placed in a dessicator for storage until use.

EXAMPLE 17

This Example illustrates a fumarate lenses coated with a co-polymer containing glycidyl methacrylate (GMA) and dimethylacrylamide (DMA) according to the present invention. A fumarate lenses (made from the material of Example 2 above) were received after solvent removal and extraction. The lenses were dried before treatment. The lenses were placed in a Branson RF plasma unit (13.56 MHz) on a tray which elevated the lenses between two electrodes and allowed the flow of gas around the lenses. The plasma unit was evacuated of air until the pressure reached 1.0 torr. Ammonia was introduced into the chamber at 1.0 torr for 1.0 minute, and the plasma was ignited at 100 watts for 20.0 seconds. The flow of ammonia was terminated and butadiene was introduced at 0.3 torr for 1.0 minute. The butadiene plasma was ignited at 100 watts for 1 minute. Finally, the butadiene flow was stopped and ammonia was reintroduced at 1.0 torr for 1.0 minute. Another ammonia plasma was ignited for 20 seconds at 100 watts. (The ammonia and butadiene gases were used as received from Rochester Welding Supply and were 99.9+% pure.)

The plasma coated lenses were placed into an aqueous solution containing a copolymer composed of glycidyl-methacrylate and dimethylacrylamide (DMA) as described in Example 14 above The solution of reactive polymer (5.0 g, 0.0007 moles) was prepared in 500 ml of water. Dissolved oxygen was removed from the solution using a bubbling stream of nitrogen for 15 minutes. In the presence of heat, the glycidyl methacrylate will react with the amine groups created on the contact lens surface by the ammonia plasma, thereby attaching the copolymer to the surface. Twenty lenses were run through one 30 minute autoclave cycle. Sixty lenses were placed in an oven at 90° C. Samples (20 each) were removed after 1, 4, and 16 hours.

The above-described procedure can be represented by the following reaction sequence:

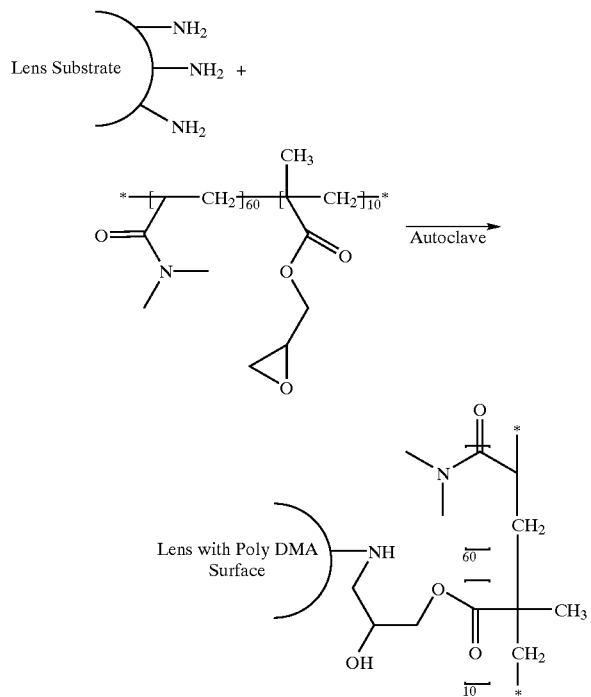

XPS analysis of the lens were conducted as described in Example 8 above. The XPS data is shown in Table 13 below.

TABLE 13

|  |  | [C] | [O] | [N] | [Si] |
|---|---|---|---|---|---|
| Control | mean | 65.8 | 17.7 | 5.7 | 10.8 |
|  | SD | 0.3 | 0.2 | 0.6 | 0.3 |
| After Plasma | mean | 81.0 | 9.2 | 7.2 | 1.8 |
|  | SD | 3.1 | 1.8 | 1.9 | 1.3 |
| After 1 hour at 90° C.-Anterior | mean | 74.4 | 17.3 | 6.9 | 1.4 |
|  | SD | 0.8 | 1.3 | 0.3 | 0.5 |
| After 4 hours at 90° C.-Anterior | mean | 73.1 | 17.8 | 7.4 | 1.7 |
|  | SD | 1.7 | 1.8 | 0.7 | 0.9 |
| After 16 hours at 90° C.-Anterior | mean | 73.0 | 17.4 | 7.8 | 1.8 |
|  | SD | 1.2 | 0.7 | 0.6 | 1.2 |
| Autoclaved Anterior | mean | 69.9 | 20.4 | 8.7 | 1.1 |
|  | SD | 1.1 | 0.5 | 0.3 | 0.3 |
| 1 hour at 90° C. Posterior | mean | 72.3 | 17.7 | 8.2 | 2.0 |
|  | SD | 0.5 | 0.3 | 0.4 | 0.6 |
| 4 hours at 90° C. Posterior | mean | 71.1 | 18.6 | 8.1 | 2.3 |
|  | SD | 1.5 | 0.5 | 0.9 | 0.3 |
| 16 hours at 90° C. Posterior | mean | 70.5 | 18.8 | 7.6 | 3.1 |
|  | SD | 2.8 | 1.5 | 1.3 | 2.4 |
| Autoclaved Posterior | mean | 68.6 | 20.8 | 8.8 | 1.9 |
|  | SD | 1.1 | 0.6 | 0.4 | 0.9 |

As shown by the results in Table 13 above, the silicon level of the control silicone fumarate lens surface was 10.8%, after plasma treatment was 1.8%, and after the plasma-treated lens was coated coated with the GMA DMA copolymer was from 1.1–2.3 percent. Thus, the silicon level did not change much between the plasma process step and the fully processed coated lens. However, the carbon level, the oxygen level, and the carbon "1s" spectra all indicated the coating had been successfully applied. The oxygen level increased and the carbon level decreased after the copolymer was coated onto the plasma-treated surface. This would be expected since DMA has less molar carbon and more oxygen than an ammonia plasma-treated carbon surface. The anterior XPS data were equivalent except for the autoclaved samples. The autoclaved lenses had more nitrogen and oxygen with less carbon which would be indicative of a higher DMA level at the surface (i.e., a thicker coating or better coverage).

AFM images were taken of the ammonia/butadiene/ammonia plasma-treated silicon fumarate lens soaked in a glycidylmethacrylate/DMA copolymer, fully processed. The Atomic Force Microscopy(AFM) image was 50 $\mu m^2$. The topography had a vermiculated surface (wave-like surface with a 0.25–0.50 $\mu m$ wavelength). The topography results from the carbon coating expanding in water. The AFM Root Mean Square (RMS) Roughnesses are shown in Table 14 below.

TABLE 14

|  | Autoclaved | | 16 hours | |
| --- | --- | --- | --- | --- |
|  | Ant. | Post. | Ant. | Post. |
| Mean | 15.5 | 13.6 | 16.3 | 10.0 |
| Sd | 1.5 | 9.9 | 1.2 | 6.0 |
|  | 4 hours | | 1 hour | |
|  | Ant. | Post. | Ant. | Post. |
| Mean | 19.8 | 14.0 | 13.1 | 6.3 |
| Sd | 1.5 | 9.9 | 2.0 | 1.5 |

As indicated by the XPS data (RMS roughness) in the above Table 14, both the anterior and posterior had a similar RMS roughness. The edge or center samples were not disassociated in this experiment. All RMS values were below 25 nm roughness. In conclusion of the above, the fumarate lenses was coated with a carbon coating followed by a GMA/DMA copolymer as shown by XPS and AFM analysis.

Many other modifications and variations of the present invention are possible in light of the teachings herein. It is therefore understood that, within the scope of the claims, the present invention can be practiced other than as herein specifically described.

What is claimed is:

1. A method for treating the surface of a silicone medical device comprising the following steps:
   (a) subjecting the surface of the silicone medical device to a plasma-polymerization reaction in a hydrocarbon-containing atmosphere to form a polymeric carbonaceous layer on the surface of the silicone medical device having a thickness of 50 to 500 Angstroms;
   (b) forming reactive functionalities on the surface of the carbonaceous layer; and
   (c) exposing the surface of the silicone medical device to a solution of a hydrophilic reactive polymer having complementary reactive functionalities on the carbonaceous layer, thereby forming a biocompatible surface on the silicone medical device,
   wherein the silicone medical device is a silicone contact lens or silicone intraocular device.

2. The method of claim 1, wherein the silicone medical device is a silicone hydrogel, continuous-wear contact lens.

3. The method of claim 2, wherein prior to step (a), the lens is subjected to a plasma pretreatment to improve adhesion of the carbonaceous layer onto the surface of the lens.

4. The method of claim 3, wherein the plasma pretreatment comprises oxidation of the surface with a nitrogen or oxygen-containing oxidizing gas.

5. The method of claim 5, wherein the plasma pretreatment is conducted at 10 to 1000 watts for a period of 1 to 10 minutes at a pressure of 0.1 to 1.0 torr.

6. The method of claim 4, wherein the plasma pretreatment is conducted in an oxygen-containing or nitrogen-containing atmosphere, comprising a gas selected from at least one of: ambient air, oxygen gas, ammonia, hydrogen peroxide, alcohol, and water.

7. The method of claim 1, wherein the plasma polymerization reaction of step (b) is conducted in an atmosphere comprising hydrocarbons having between 1 to 10 carbon atoms.

8. The method of claim 7, wherein the hydrocarbons are aliphatic or olefinic and comprise 4 to 8 carbon atoms.

9. The method of claim 8, wherein the hydrocarbons comprise at least one of:
   butane, isoprene, isobutylene, and 1,3-butadiene.

10. A method for treating the surface of a silicone medical device comprising the following steps:
    (a) subjecting the surface of the silicone medical device to a plasma-polymerization reaction in a hydrocarbon-containing atmosphere to form a polymeric carbonaceous layer on the surface of the silicone medical device having a thickness of 50 to 500 Angstroms;
    (b) forming reactive functionalities on the surface of the carbonaceous layer by plasma treatment with a nitrogen-containing gas or gaseous mixture; and
    (c) exposing the surface of the silicone medical device to a solution of a hydrophilic reactive polymer having complementary reactive functionalities on the carbonaceous layer, thereby forming a biocompatible surface on the silicone medical device.

11. The method of claim 1, wherein the hydrophilic reactive polymer comprises 0 to 99 mole percent of monomeric units that are derived from non-reactive hydrophilic monomers.

12. The method of claim 11, wherein the polymer comprises 50 to 95 mole percent of monomeric units derived from non-reactive hydrophilic monomers selected from the group consisting of acrylamides, lactones, poly (alkyleneoxy)methacrylates, methacrylic acid or hydroxyalkyl methacrylates, and 5 to 50 percent of monomeric units derived from compatible functionally reactive monomers selected from the group consisting of isocyanate, epoxy, azlactone, and anhydride containing monomers, and combinations thereof, wherein the alkyl or alkylene groups have 1 to 6 carbon atoms.

13. The method of claim 11, wherein the hydrophilic monomers are selected from the group consisting of dimethylacrylamide, acrylamide, hydroxyethyl methacrylate, and N-vinyl pyrrolidinone.

14. The method of claim 1, wherein the hydrophilic reactive polymer comprises 0 to 20 mole percent monomeric units derived from hydrophobic monomers.

15. The method of claim 1, wherein the hydrophilic reactive polymer comprises oxazolinone moieties having the following formula:

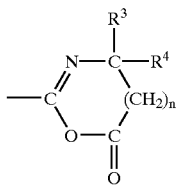

wherein $R^3$ and $R^4$ independently can be an alkyl group having 1 to 14 carbon atoms;

a cycloalkyl group having 3 to 14 carbon atoms;

an aryl group having 5 to 12 ring atoms;

an arenyl group having 6 to 26 carbon atoms; and 0 to 3 heteroatoms selected from S, N, and nonperoxidic O; or $R^3$ and $R^4$ taken together with the carbon to which they are joined can form a carbocyclic ring containing 4 to 12 ring atoms, and n is an integer 0 or 1.

16. The method of claim 15, wherein the polymer comprises the reaction product of a mixture of monomers comprising the monomer represented by the general formula:

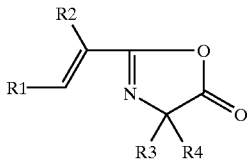

where $R^1$ and $R^2$ independently denote a hydrogen atom or a lower alkyl radical with one to six carbon atoms, and $R^3$ and $R^4$ independently denote alkyl radicals with one to six carbon atoms or a cycloalkyl radicals with 5 or 6 carbon atoms.

17. The method of claim 16, wherein the monomer is selected from the group consisting of 2-vinyl-4,4-dimethyl-2-oxazolin-5-one;

2-isopropenyl-4,4-dimethyl-2-oxazolin-5-one; and 2-vinyl-4,4-dimethyl-2-oxazolin-5-one.

18. The method of claim 1, wherein the medical device is dipped in a solution comprising at least one hydrophilic reactive polymer.

19. The method of claim 1, wherein the carbon layer is subjected to a plasma treatment with a gas comprising ammonia or an alkyl amine.

20. A method for treating the surface of a silicone medical device comprising the following steps:

(a) subjecting the surface of the silicone medical device to a plasma-polymerization reaction in a hydrocarbon-containing atmosphere to form a polymeric carbonaceous layer on the surface of the lens having a thickness of 50 to 500 Angstroms;

(b) forming reactive functionalities on the surface of the carbonaceous layer; and exposing the surface of the silicone medical device to a solution of a hydrophilic reactive polymer selected from the group consisting of glycidyl methacrylate, maleic anhydride, itaconic anhydride, and isocyanotmethacrylate having complementary reactive functionalities along the polymer chain in order to covalently bond with said reactive functionalities on the carbonaceous layer, thereby forming a biocompatible surface on the silicone medical device.

21. A silicone medical device including a hydrophilic surface, wherein said surface comprises:

(a) a carbonaceous layer on the surface of the medical device; and (b) hydrophilic polymer chains attached to the carbonaceous layer wherein the points of attachment are the result of the reaction of complementary reactive functionalities in monomeric units along the hydrophilic polymers with reactive functionalities on the carbonaceous layer wherein hydrophilic polymer chains attached to the carbonaceous layer are the result of the reaction of a mixture of polymers comprising (a) a first hydrophilic reactive polymer having reactive functionalities in monomeric units along the hydrophilic polymers complementary to reactive functionalities on the carbonaceous layer and, in addition, (b) a second hydrophilic reactive polymer having supplemental reactive functionalities that are reactive with the first hydrophilic reactive polymer and wherein the first hydrophilic reactive polymer is an epoxy-functional polymer and the second hydrophilic reactive polymer is an acid-functional polymer, either simultaneously or sequentially applied to the substrate to be coated.

22. The medical device of claim 21, wherein the medical device is a silicone contact lens or an intraocular lens.

23. The medical device of claim 21, wherein the medical device is a silicone hydrogel, continuous-wear lens.

24. The medical device of claim 21, wherein the hydrophilic polymer chains attached to the medical device are the result of the reaction of isocyanate or ring-opening reactive functionalities in monomeric units along the hydrophilic reactive polymers with said reactive functionalities on the surface of the medical device.

25. The medical device of claim 21, wherein the hydrophilic polymer chains comprise 1 to 100 mole percent of monomeric units having reacted reactive functionalities and 0 to 99 mole percent of monomeric units that are derived from non-reactive hydrophilic monomers.

26. The medical device of claim 21, wherein the reactive functionalities are derived from monomers containing one or more of the following groups:

glycidyl, azlactone, isocyanate, and acid anhydride.

27. The medical device of claim 21, wherein the hydrophilic monomeric units are derived from monomers selected from the group consisting of acrylamides, lactams, poly (alkyleneoxy)methacrylates, methacrylic acid or hydroxyalkyl methacrylates.

28. The medical device of claim 21, wherein the hydrophilic polymer chains comprise moieties along the chain having the following formula:

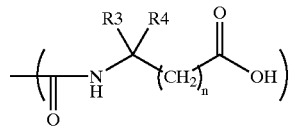

wherein $R^3$ and $R^4$ independently can be an alkyl group having 1 to 14 carbon atoms;

a cycloalkyl group having 3 to 14 carbon atoms;

an aryl group having 5 to 12 ring atoms;

an arenyl group having 6 to 26 carbon atoms; and 0 to 3 heteroatoms selected from S, N, and nonperoxidic O; or $R^1$ and $R^2$ taken together with the carbon to which they are joined can form a carbocyclic ring containing 4 to 12 ring atoms, and n is an integer 0 or 1.

29. The medical device claim 21, wherein the hydrophilic polymer chains comprise moieties along the chain represented by the general formula:

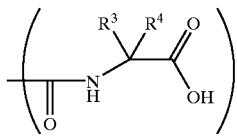

where $R^3$ and $R^4$ independently denote a hydrogen atom or a lower alkyl radical with one to six carbon atoms, and $R^3$ and $R^4$ independently denote alkyl radicals with one to six carbon atoms or a cycloalkyl radicals with 5 or 6 carbon atoms.

30. The method of claim 11, wherein the hydrophilic monomers are selected from the group consisting of dimethylacrylamide, acrylamide, hydroxyethyl methacrylate, and N-vinyl pyrrolidinone.

31. The method of claim 20, wherein the reactive functionalities are formed by plasma treatment with a nitrogen-containing gas or gaseous mixture.

32. The method of claim 20, wherein the hydrophilic reactive polymer comprises 0 to 99 mole percent of monomeric units that are derived from non-reactive hydrophilic monomers.

* * * * *